(12) United States Patent
Gulati et al.

(10) Patent No.: US 12,038,523 B2
(45) Date of Patent: Jul. 16, 2024

(54) RADAR TRANSMISSION PARAMETER SELECTION FOR MULTI-RADAR COEXISTENCE

(71) Applicant: QUALCOMM Incorporated, San Diego, CA (US)

(72) Inventors: Kapil Gulati, Belle Mead, NJ (US); Dan Zhang, San Diego, CA (US); Gene Wesley Marsh, San Diego, CA (US); Preeti Kumari, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 683 days.

(21) Appl. No.: 17/210,161

(22) Filed: Mar. 23, 2021

(65) Prior Publication Data
US 2022/0308159 A1    Sep. 29, 2022

(51) Int. Cl.
*G01S 7/02*     (2006.01)
*G01S 7/00*     (2006.01)
*G01S 13/931*   (2020.01)

(52) U.S. Cl.
CPC ............. *G01S 7/023* (2013.01); *G01S 7/003* (2013.01); *G01S 13/931* (2013.01); *G01S 2013/9316* (2020.01)

(58) Field of Classification Search
CPC ........ G01S 7/023; G01S 7/003; G01S 13/931; G01S 2013/9316
See application file for complete search history.

(56) References Cited

U.S. PATENT DOCUMENTS

| | | | | |
|---|---|---|---|---|
| 5,497,162 | A * | 3/1996 | Kaiser | G01S 7/023 342/147 |
| 11,585,919 | B2 * | 2/2023 | Gulati | G01S 13/343 |
| 11,614,511 | B2 * | 3/2023 | Servadei | G06N 5/043 342/83 |
| 11,733,346 | B2 * | 8/2023 | Gulati | G01S 13/931 342/60 |
| 2005/0156780 | A1 * | 7/2005 | Bonthron | G01S 3/48 342/134 |

(Continued)

FOREIGN PATENT DOCUMENTS

DE    102019202836 A1    9/2020
JP        2010048716 A    3/2010

OTHER PUBLICATIONS

International Search Report and Written Opinion—PCT/US2022/019807—ISA/EPO—dated Jun. 2, 2022 (2101709WO).

*Primary Examiner* — Peter M Bythrow
(74) *Attorney, Agent, or Firm* — Holland & Hart LLP

(57) ABSTRACT

Methods, systems, and devices for wireless communications are described. A user equipment (UE), such as a vehicle UE may determine, based on one or more communication parameters of the UE, a radar field of view (FOV) for radar communications at the UE relative to a fixed frame of reference for the wireless communications system. The UE may determine a set of radar transmission parameters based on the radar FOV, where each radar transmission parameter of the set of radar transmission parameters is a function of the radar FOV. The UE may transmit a radar message using the set of radar transmission parameters according to the radar FOV relative to the fixed frame of reference.

30 Claims, 16 Drawing Sheets

(56) References Cited

U.S. PATENT DOCUMENTS

| | | | |
|---|---|---|---|
| 2017/0111122 A1* | 4/2017 | Shimizu | H04W 4/80 |
| 2017/0310758 A1* | 10/2017 | Davis | G01S 13/931 |
| 2019/0086509 A1* | 3/2019 | Bilik | G01S 13/87 |
| 2019/0238658 A1* | 8/2019 | Shimizu | H04W 4/46 |
| 2019/0369233 A1* | 12/2019 | Niesen | H04W 4/46 |
| 2019/0383925 A1* | 12/2019 | Gulati | G01S 7/352 |
| 2020/0256948 A1* | 8/2020 | Jansen | G01S 13/34 |
| 2021/0003662 A1* | 1/2021 | Aydogdu | G01S 13/343 |
| 2022/0260671 A1* | 8/2022 | Chen | G01S 7/0232 |
| 2023/0084041 A1* | 3/2023 | Moss | G01S 7/023 342/59 |

* cited by examiner

RADAR TRANSMISSION PARAMETER SELECTION FOR MULTI-RADAR COEXISTENCE

FIELD OF TECHNOLOGY

The following relates to wireless communications, including radar transmission parameter selection for multi-radar coexistence.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device, such as a vehicle UE, may transmit radar signaling to support target detection and collision avoidance. In some cases, a UE may experience interference from radar signals transmitted by neighboring UE(s) or vehicles. For example, a UE may transmit radar signaling and may experience radar interference from one or more other UEs which may result in relatively inaccurate and inefficient target detection.

SUMMARY

The described techniques relate to improved methods, systems, devices, and apparatuses that support radar transmission parameter selection for multi-radar coexistence. Generally, the described techniques provide for reducing or mitigating interference between wireless devices that employ radar detection in wireless communications systems having multiple such wireless devices. In some wireless communications systems (e.g., vehicle-to-everything (V2X) systems), a user equipment (UE) may transmit radar signaling using one or more parameters for radar transmissions based on one or more characteristics of operations at the UE. The UE may coordinate (e.g., autonomously, or with a base station, among other examples) the one or more parameters such that interference caused by radar transmissions of neighboring UEs may be reduced. For example, the UE may determine a field of view (FOV) for radar transmissions based on a fixed (e.g., global, regional, local, or the like) frame of reference (e.g., with respect to the surroundings or location of the UE) and may determine a set of radar transmission parameters based on the determined FOV. The FOV may include an area in which radar signaling transmitted by the UE may propagate with respect to the fixed frame of reference and thus the coordinates of the FOV may change as the UE travels or changes location. The radar transmission parameters may include a time division multiplexing (TDM) pattern, frequency spectrum, polarization, transmission power, frequency modulated continuous wave (FMCW) parameters, phase modulated continuous wave (PMCW) waveform, or a waveform sequence, among other examples. The UE may transmit a radar message for target detection and collision avoidance based on the determined set of parameters, which may reduce interference caused by neighboring UEs.

A method is described. The method may include transmitting, to a second wireless device, an indication of a radar FOV for radar communications at the first wireless device, the radar FOV relative to a fixed frame of reference for the wireless communications system and transmitting a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

An apparatus is described. The apparatus may include a processor, memory coupled with the processor, and instructions stored in the memory. The instructions may be executable by the processor to cause the apparatus to transmit, to a second wireless device, an indication of a radar FOV for radar communications at the first wireless device, the radar FOV relative to a fixed frame of reference for the wireless communications system and transmit a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

Another apparatus is described. The apparatus may include means for transmitting, to a second wireless device, an indication of a radar FOV for radar communications at the first wireless device, the radar FOV relative to a fixed frame of reference for the wireless communications system and means for transmitting a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

A non-transitory computer-readable medium storing code is described. The code may include instructions executable by a processor to transmit, to a second wireless device, an indication of a radar FOV for radar communications at the first wireless device, the radar FOV relative to a fixed frame of reference for the wireless communications system and transmit a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

Some examples of the method, apparatuses, and non-transitory computer-readable medium described herein may further include operations, features, means, or instructions for determining the radar FOV based on one or more of a geographic location of the wireless device, an orientation of the wireless device, a direction of travel of the wireless device, a location of a transmitter of the wireless device, or a radiation pattern associated with an antenna of the wireless device.

Some examples of the method, apparatuses, and non-transitory computer-readable medium described herein may further include operations, features, means, or instructions for determining the set of radar transmission parameters based on a TDM pattern, a frequency spectrum, a polarization parameter, a transmission power for the radar message, one or more parameters associated with a waveform of the radar message, a waveform sequence, or any combination thereof.

In some examples of the method, apparatuses, and non-transitory computer-readable medium described herein, the one or more parameters associated with the waveform of the radar message includes a slope, a time offset, a code of a PMCW waveform for the radar message, a frequency offset of a FMCW waveform for the radar message, or any combination thereof.

Some examples of the method, apparatuses, and non-transitory computer-readable medium described herein may further include operations, features, means, or instructions for determining the set of radar transmission parameters based on a transmit power for the radar message, a duration of a frame of the radar message, a duty cycle associated with frame transmissions for the wireless device, a traffic pattern associated with a geographic location of the wireless device, or any combination thereof.

Some examples of the method, apparatuses, and non-transitory computer-readable medium described herein may further include operations, features, means, or instructions for receiving, from the second wireless device, the set of radar transmission parameters based on transmitting the indication of the radar FOV.

Some examples of the method, apparatuses, and non-transitory computer-readable medium described herein may further include operations, features, means, or instructions for receiving, from the second wireless device, a set of allowed radar transmission parameters for the wireless device based on the radar FOV, where the set of radar transmission parameters may be selected from the set of allowed radar transmission parameters.

In some examples of the method, apparatuses, and non-transitory computer-readable medium described herein, the second wireless device includes a fixed roadside unit or a base station and the fixed frame of reference may be a global frame of reference.

In some examples of the method, apparatuses, and non-transitory computer-readable medium described herein, the indication further includes an intended transmit power of the radar message, a duration of a frame of the radar message, a duty cycle associated with a transmission frame of the radar message, a traffic pattern associated with a geographic location of the wireless device, or any combination thereof.

Some examples of the method, apparatuses, and non-transitory computer-readable medium described herein may further include operations, features, means, or instructions for determining a congestion of radar communications associated with a geographic location of the wireless device, where the set of radar transmission parameters may be based on the congestion of radar communications.

Some examples of the method, apparatuses, and non-transitory computer-readable medium described herein may further include operations, features, means, or instructions for receiving, from one or more neighboring wireless devices or a base station, an indication of the congestion of radar communications.

In some examples of the method, apparatuses, and non-transitory computer-readable medium described herein, the congestion of radar communications may be based on a vehicle density in the geographic location of the wireless device, an estimate of radar usage associated with one or more neighboring wireless devices, an indication of radar usage associated with one or more neighboring vehicles, or any combination thereof.

A method is described. The method may include receiving, from a second wireless device, an indication of a radar FOV for radar communications at the second wireless device relative to a fixed frame of reference for the wireless communications system and transmitting, to the second wireless device, a set of radar transmission parameters for the second wireless device based on the indication of the FOV, each radar transmission parameter of the set of radar transmission parameters is a function of the radar FOV for radar communications at the second wireless device.

An apparatus is described. The apparatus may include a processor, memory coupled with the processor, and instructions stored in the memory. The instructions may be executable by the processor to cause the apparatus to receive, from a second wireless device, an indication of a radar FOV for radar communications at the second wireless device relative to a fixed frame of reference for the wireless communications system and transmit, to the second wireless device, a set of radar transmission parameters for the second wireless device based on the indication of the FOV, each radar transmission parameter of the set of radar transmission parameters is a function of the radar FOV for radar communications at the second wireless device.

Another apparatus is described. The apparatus may include means for receiving, from a second wireless device, an indication of a radar FOV for radar communications at the second wireless device relative to a fixed frame of reference for the wireless communications system and means for transmitting, to the second wireless device, a set of radar transmission parameters for the second wireless device based on the indication of the FOV, each radar transmission parameter of the set of radar transmission parameters is a function of the radar FOV for radar communications at the second wireless device.

A non-transitory computer-readable medium storing code is described. The code may include instructions executable by a processor to receive, from a second wireless device, an indication of a radar FOV for radar communications at the second wireless device relative to a fixed frame of reference for the wireless communications system and transmit, to the second wireless device, a set of radar transmission parameters for the second wireless device based on the indication of the FOV, each radar transmission parameter of the set of radar transmission parameters is a function of the radar FOV for radar communications at the second wireless device.

In some examples of the method, apparatuses, and non-transitory computer-readable medium described herein, determining the set of radar transmission parameters may include operations, features, means, or instructions for determining one or more conditions associated with a location of the wireless device and determining the set of radar transmission parameters based on the one or more conditions.

Some examples of the method, apparatuses, and non-transitory computer-readable medium described herein may further include operations, features, means, or instructions for determining a set of allowed radar transmission parameters for the second wireless device based on receiving the indication of the radar FOV for radar communications at the second wireless device and transmitting, to the second wireless device, an indication of the set of allowed radar transmission parameters according to the radar FOV relative to the fixed frame of reference.

In some examples of the method, apparatuses, and non-transitory computer-readable medium described herein, each parameter of the set of allowed radar transmission parameters may be based on the radar FOV.

In some examples of the method, apparatuses, and non-transitory computer-readable medium described herein, the second wireless device may be a vehicle and the fixed frame of reference may be a global frame of reference.

DETAILED DESCRIPTION

Figure 1:
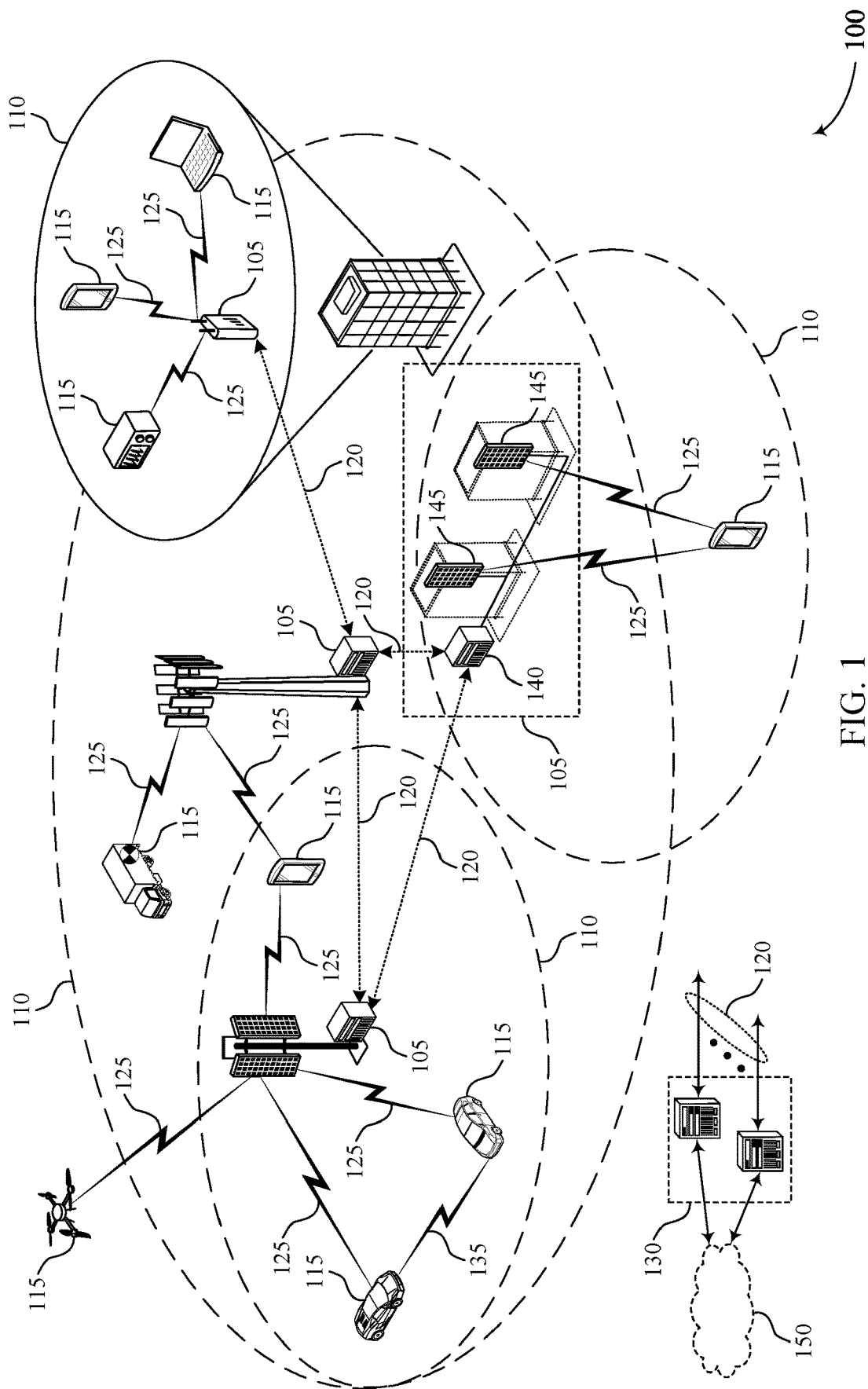
FIG. 1 illustrates an example of a wireless communications system that supports radar transmission parameter selection for multi-radar coexistence in accordance with aspects of the present disclosure.

In some wireless communications systems, radio frequency signaling, such as radar signaling, (e.g., Frequency Modulated Continuous Wave (FMCW) radar, Phase Modulated Continuous Wave (PMCW) radar, or the like) may be implemented in a wide range of applications including vehicle ranging for target detection. In some examples, radar signaling may be employed by a user equipment (UE) such as a vehicle UE, which may be operating in a full duplex mode supporting simultaneous uplink and downlink transmissions in a same time period. For example, the vehicle UE may transmit radar signaling to detect potential targets and avoid collisions with the detected target. In some cases, other vehicle UEs in the vicinity of the UE (e.g., neighboring UEs) may also transmit radar signaling which may potentially cause interference that may obscure or overwhelm radar reflected from a target and may not include identifying features, preventing the UE from discerning interference and identifying the target and its location.

In some examples, radar signaling from a neighboring UE may interfere with radar reflected from a target (e.g., that was originally transmitted by the UE) which may result in relatively inaccurate and inefficient target detection. In some examples, interference from the neighboring UE may be detected by the UE and may be incorrectly identified as a target (e.g., a ghost target) which may cause the UE to perform operations or measures (e.g., preventative measures) which in turn may cause undesirable or ineffective operations. For example, the UE may maneuver to avoid a ghost target and as a result may encounter an undetected target which was obscured by interference. In some examples, interference from the neighboring UE may cause the UE to experience a high level of noise (e.g., may increase a noise floor) based on radar waveforms transmitted by the UE, which may obscure reflected signaling from a target, for example. In some examples, power received from radar signaling reflected by a target may decay (e.g., decrease in received power at the UE) more quickly than interference from a neighboring UE which may also cause obfuscation of radar reflected from potential targets. In some such examples, interference from the neighboring UE may cause a reduction in the range of radar transmissions of the UE, thereby decreasing the accuracy of target detection and collision avoidance at the UE. Thus, the UE may not detect some radar signaling (e.g., radar signaling reflected by a target), when the UE experiences interference from neighboring UEs.

The techniques herein may reduce or mitigate the effects of radar signaling interference, which may, for example, be caused by neighboring UEs or other devices transmitting radar signals. A UE may determine an FOV based on one or more communication parameters (e.g., UE orientation, radar transmitter location, UE location, direction of travel, antenna radiation pattern) based on a fixed frame of reference (e.g., with respect to the environment or position of the UE). The determined FOV may include an area in which radar signaling transmitted by the UE may effectively propagate so as to allow for accurate radar reflections and reduce interference at neighboring UEs. The UE may determine one or more parameters for radar transmission (e.g., a time division multiplexing (TDM) pattern, frequency spectrum parameters, a polarization, transmission power, FMCW parameters (slope, time offset, frequency offset), PMCW waveform (code), or a waveform sequence, among other examples) based on the determined FOV. In some examples, the UE may coordinate the one or more radar transmission parameters with a base station. For example, the UE may transmit information including the determined FOV or a set of initial radar parameters, or both to the base station. The base station may receive the transmission and may determine a set of radar transmission parameters that are based on the received information received. The base station may transmit the determined set of radar transmission parameters to the UE. Additionally, or alternatively, the base station may determine a set of allowed parameters based on one or more conditions associated with a location of the UE (e.g., traffic pattern, intersection shape, among other examples) and may transmit a set of allowed radar transmission parameters to the UE to use for target detection and tracking. In any case, the UE may transmit radar signaling using the determined parameters to reduce or mitigate interference from other radar signaling from other sources or devices (e.g., neighboring UE).

In some cases, one or more parameters may be determined based on additional considerations. For example, based on an initial transmission power, the radar signaling may propagate throughout an area and the UE may experience more interference than radar signaling transmitted with a lower initial transmission power. The UE may compensate for such interference by using a TDM pattern with a lower duty ratio. By transmitting during coordinated intervals and allowing other UEs to transmit during complementary intervals, the UE may avoid interference in areas with multiple radar signaling sources. In some cases, the UE may use geographical information (e.g., the number of lanes on a highway, the lane in which the UE is operating, among other examples), such as a map corresponding to the location of the UE, to determine one or more direction(s) from which interfering signals may be received (e.g., from a crossroads, from a neighboring lane, among other examples). The UE may determine the radar transmission parameters based on the geographical information to mitigate interference from other signals, for example, in the determined directions. The UE may, Additionally, or alternatively, determine the radar transmission parameters based on factors associated with radar operations of the UE (e.g., transmission power, transmission duration, duty cycle, geographical information, travel parameters of the UE (e.g., orientation, location, direction of travel), radar transmitter placement, radiation pattern, or the like).

By coordinating the radar transmission parameters with the base station or autonomously based on the determined FOV, the UE may reduce its exposure to interference and may reduce interference in the wireless communications system overall (e.g., with respect to neighboring UE). For example, the UE may transmit radar signaling using the determined set of transmission parameters which may result in reduced interference at the UE. Accordingly, the UE may efficiently detect targets and avoid collisions, among other benefits.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to radar transmission parameter selection for multi-radar coexistence.

FIG. 1 illustrates an example of a wireless communications system 100 that supports radar transmission parameter selection for multi-radar coexistence in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may transmit radar signaling in full duplex mode in a wide range of applications including vehicle ranging for target detection and the like. The UE 115 may determine, based on or one more communication parameters, a radar FOV for radar communications at the UE 115 relative to a fixed frame of reference (e.g., a frame of reference that is stationary with respect to the UE) within the wireless communications system 100. The one or more communication parameters may include a location of the UE 115, a heading or direction of travel of the UE 115, an orientation (e.g., a cardinal direction) of the UE 115, a placement of a radar transmitter on or within the UE 115, or a radiation parameter associated with an antenna of the UE 115, among other examples. The UE 115 may determine a set of radar transmission parameters for radar communications at the UE 115 based on the radar FOV, where each radar transmission parameter of the set of radar transmission parameters is a function of the radar FOV. For example, the UE 115 may determine a TDM pattern, a frequency spectrum, a polarization parameter, a transmission power for radar communications, one or more parameters associated with a waveform of radar communications, or a waveform sequence, among other examples. In some examples, determining the set of radar transmission parameters is further based on a transmit power for radar communication, a duration of a frame of the radar communications, a duty cycle associated with frame transmissions for the UE 115, or a traffic pattern associated with a geographic location of the UE 115, among other examples.

In some examples, a base station 105 may transmit a set of allowed radar transmission parameters based on the location of the UE 115. The set of allowed radar transmission may be a function of the FOV of radar communications within the fixed frame of reference. In some examples, the UE 115 may transmit an indication of the radar FOV for radar communications at the UE 115 relative to the fixed frame of reference. The base station 105 may determine a set of radar transmission parameters for the UE 115 based on receiving the indication of the radar FOV for radar communications at the UE 115 and may transmit, to the second wireless device, an indication of the set of radar transmission parameters according to the radar FOV relative to the fixed frame of reference. In any case, the UE 115 may transmit radar signaling using the set of determined radar transmission parameters according to the radar FOV relative to the fixed frame of reference. As such, the UE 115 may experience less radar interference and may be more readily able to identify a target within the wireless communications system 100.

Figure 2:
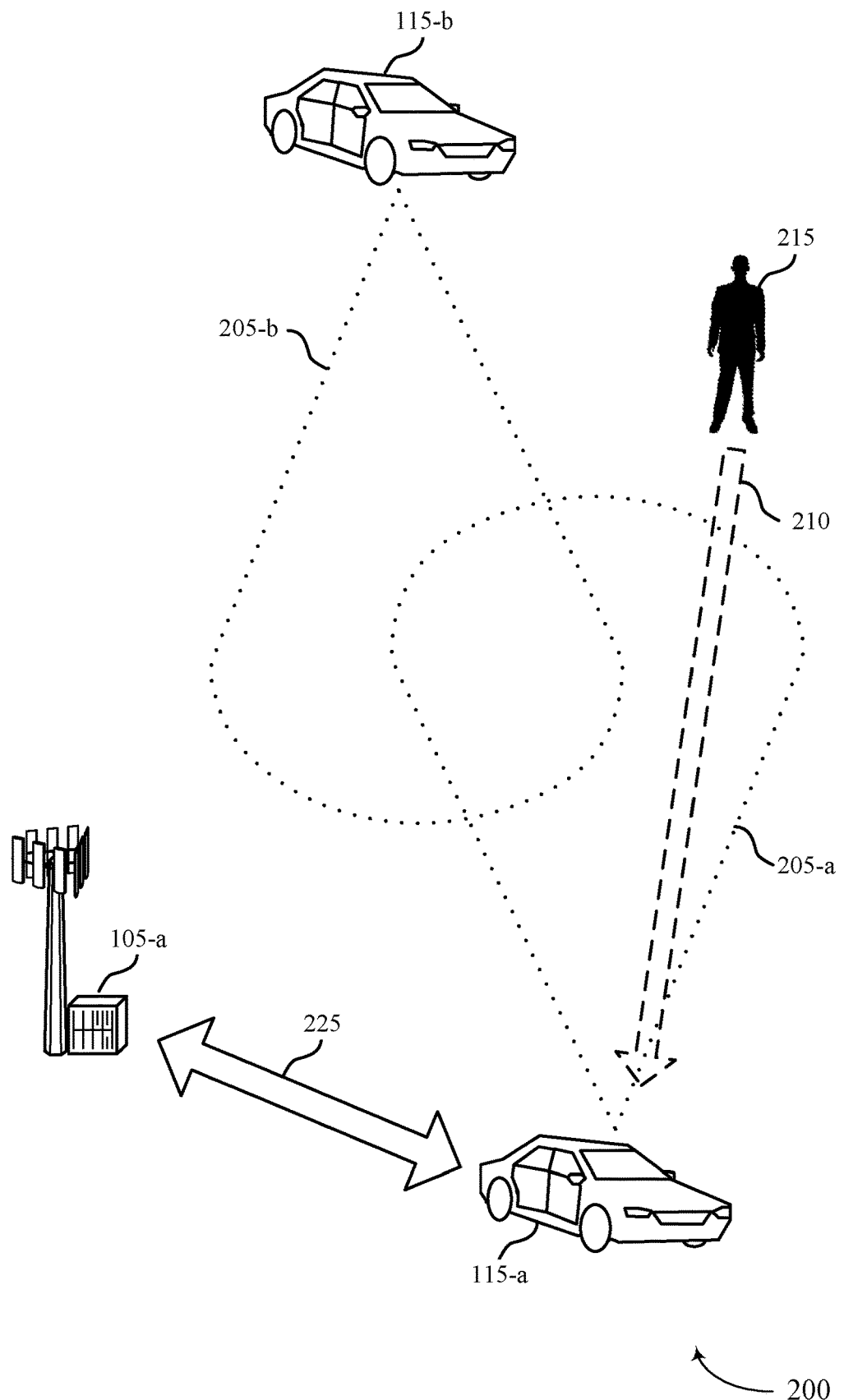
FIG. 2 illustrates an example of a wireless communications system that supports radar transmission parameter selection for multi-radar coexistence in accordance with aspects of the present disclosure.

FIG. 2 illustrates an example of a wireless communications system 200 that supports radar transmission parameter selection for multi-radar coexistence in accordance with aspects of the present disclosure. In some examples, the wireless communications system 200 may implement aspects of the wireless communications system 100. For instance, the wireless communications system 200 includes UEs 115-a and 115-b, which may be examples of a UE 115 as described with reference to FIG. 1. The wireless communications system 200 also includes a base station 105-a, which may be an example of a base station 105 as described with reference to FIG. 1. Wireless communications system 200 also includes a target 215. In some examples, the UE 115-a in the wireless communications system 200 may implement communications for selecting radar transmission parameters to reduce interference from other nearby radar sources.

The UE 115-a and the UE 115-b may transmit radar signaling 205-a and 205-b, respectively. In some cases, the radar signaling 205-a and 205-b may be radar signaling such as FMCW radar signaling or PMCW radar signaling, which may enable the UEs 115-a and 115-b with various functionalities (e.g., ranging, environmental and object detection, among other examples). For example, the UE 115-a may transmit the radar signaling 205-a with radar transmission parameters based on a FOV of the UE 115-a. In some cases, wireless communications system 200 may include multiple radar sources (e.g., UE 115-a and UE 115-b) which may cause the UE 115-a to experience radar interference. For instance, the UE 115-b may transmit the radar signaling 205-b which may be detected by the UE 115-a. The UE 115-a may not be able to distinguish radar signaling 205-b from a reflected radar signal 210 which may reduce the radar tracking range of the UE 115-a. In some cases, the UE 115-a may experience as much as a 34% or more reduction in tracking range capability in the presence of interference. In some cases, interfering sources may appear to the UE 115-a as a target with an inaccurate position (e.g., a ghost target) or may result in the UE 115-a detecting an increased amount of noise which may also contribute to a decreased tracking range at the UE 115-a.

For example, the UE 115-a may transmit radar signaling 205-a to perform target detection and tracking. In such cases, the UE 115-a may transmit the radar signaling 205-a which may be reflected by the target 215. The UE 115-a may receive the reflected radar signal 210 and may generate an image of the target 215, including information about its position with respect to the UE 115-a. The UE 115-a may determine an association between the detected radar image and the target 215. For example, the UE 115-a may map the radar detections to the tracked target 215 to generate continuous tracking data for the target 215. The UE 115-a may be likely to experience error in radar detection operations (e.g., mis-detecting the target 215, false alarm detection, mistaking a new target for the tracked target 215, among other possibilities) and may include the likelihood of such errors in the association between the radar image and the target 215. The UE 115-a may track the target 215 and any potential sources of interference (e.g., the UE 115-b). The UE 115-a may be able to use information from tracking the UE 115-b and the target 215 to predict potential errors and coordinate radar transmission parameters to reduce interference between the radar signaling 205-a and 205-b.

Increased noise may contribute to a significant reduction in the tracking range of the UE 115-a, making it less sensitive overall to signal detection. In some cases, the interfering source may be much stronger than the reflected radar signal, obscuring the reflected radar signal 210 as the UE 115-a detects both signals. The result of interfering radar sources at the UE 115-a may vary depending on the radar waveforms used by the UE 115-a and the interfering sources (e.g., the UE 115-b). Signal interference may degrade ranging accuracy and object detection (e.g., detection of the target 215).

The techniques described herein support a coordination scheme for interference management, and may result in decreased interference at the UE 115-a. For example, the UE 115-a may determine an FOV for radar communications relative to a fixed frame of reference such as an FOV that is stationary with respect to the UE 115-a and may determine a set of radar transmission parameters based on the FOV.

The FOV may be determined based on one or more physical components of the radar transmitter including a location of the UE 115-*a*, an orientation of the radar transmitter(s) associated with the UE 115-*a*, an orientation of the UE 115-*a*, a direction of travel, radar transmitter placement, antenna radiation pattern, among other examples). In some examples, the UE 115-*a* may determine the radar transmission parameters based at least in part on the FOV of the radar transmissions relative to the fixed frame of reference. The radar transmission parameters may include a TDM pattern, a frequency spectrum, a polarization, a transmission power, one or more FMCW parameters (e.g., slope, time offset, frequency offset), a PMCW waveform (e.g., code), a waveform sequence, etc. In some examples, the UE 115-*a* may communicate with the base station 105-*a* via a communications link 225 to coordinate the radar transmission parameters.

For example, the radar transmission parameters may be determined based at least in part on communications between the UE 115-*a* and the base station 105-*a*. The UE 115-*a* may transmit an indication of the FOV to the base station 105-*a* via communications link 225. In some examples, the indication may further include an intended transmit power of radar communications at the UE 115-*a*, a duration of transmission of one radar frame of the radar communications, and a duty cycle of frame transmissions (e.g., 100% or 50% or 25%, etc.), among other examples. The base station 105-*a* may determine and transmit a set of radar transmission parameters to the UE 115-*a* based on the received indication.

In some examples, the base station 105-*a* may have access to updated information regarding a number of radar sources in a location of the UE 115-*a*, a local traffic pattern, current levels of signal congestion, etc. Based on this information, the base station 105-*a* may transmit a proposed (e.g., allowed) set of radar transmission parameters to the UE 115-*a* via the communications link 225. In some examples, the set of allowed radar transmission parameters may be a function of the FOV relative to the fixed (e.g., global, stationary, or the like) frame of reference. In any case described herein, the UE 115-*a* may transmit radar signaling 205-*a* based on the determined set of radar transmission parameters which may reduce the effects of interference with the radar signaling 205-*b*.

Figure 3A:
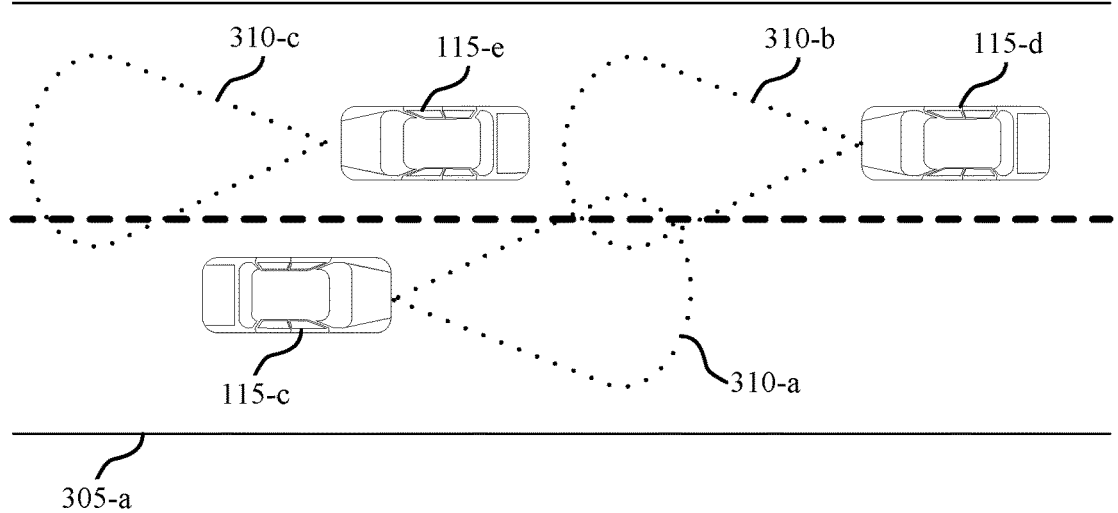
FIGS. 3A and 3B illustrate examples of a wireless communications system that support radar transmission parameter selection for multi-radar coexistence in accordance with aspects of the present disclosure.

FIG. 3A illustrates an example of a wireless communications system 301 that supports radar transmission parameter selection for multi-radar coexistence in accordance with aspects of the present disclosure. In some examples, wireless communications system 301 may implement aspects of the wireless communications system 100 or 200. For example, UEs operating in the wireless communications system 301 may experience interference between radar signaling due to direction of motion and geometry of a roadway 305-*a* within the wireless communications system 301. The wireless communications system 301 may include one or more vehicles (e.g., a UE 115-*c*, a UE 115-*d*, a UE 115-*e*) that may travel in various directions or lanes within the roadway 305-*a*. The UEs 115-*c*, 115-*d*, and 115-*e* may support selecting radar transmission parameters for multi-radar coexistence based on a direction of travel, orientation (e.g., cardinal direction), and radar FOV, or any combination thereof in accordance with aspects of the present disclosure.

Each of UE 115-*c*, 115-*d*, and 115-*e* may include one or more radar transmitters which may transmit long-range radar (LRR), mid-range radar (MRR), or short range radar (SRR). For example, a transmitter on a frontside of a vehicle may transmit LRR, a transmitter on a backside of a vehicle may transmit MRR while a transmitter on a left or right side of a vehicle UE 115 may transmit SRR. In some examples, the UE 115-*c* may transmit radar signaling 310-*a* (e.g., LRR) to support various functionalities of the UE 115-*c* (e.g., target tracking for environmental and object detection, among other examples) while in operation. The UEs 115-*d* and 115-*e* may transmit radar signaling 310-*b* and 310-*c*, respectively, while traveling in an opposite direction of the UE 115-*c*. Based on the local geometry of the roadway 305-*a*, the area between opposing lanes of traffic may be an area of high mutual interference between radar signals. For example, the radar signaling 310-*a* may interact with the radar signaling 310-*b*, which may cause interference in any reflected radar received by the UEs 115-*c* and 115-*d* respectively. In some examples, the UEs 115-*c* and 115-*d* may determine a FOV based on a fixed frame of reference which may include the roadway 305-*a* and any associated geometries and may select radar transmission parameters for the radar signaling 310-*a* and 310-*b* which may reduce the amount of interference detected by the UEs 115-*c* and 115-*d*.

In some examples, the UE 115-*d* may detect a reflection of the radar signaling 310-*b* and may determine that the UE 115-*e* is traveling in the same direction in the same lane. The UE 115-*e* may transmit the radar signaling 310-*c* to detect potential obstacles in its FOV. The area between the UEs 115-*d* and 115-*e* may be an area of low mutual interference because the UE 115-*d* and the UE 115-*e* are transmitting radar signaling in the same direction and thus, the radar signaling 310-*b* may be unlikely to interfere with the radar signaling 310-*c*. The UEs 115-*c*, 115-*d*, and 115-*e* may use information about the geometry of the roadway 305-*a* to determine radar transmission parameters. For example, the UE 115-*d* may determine that its radar transmission FOV encompasses both the high mutual interference area and the low mutual interference area. The UE 115-*d* may determine the radar transmission parameters for the radar signaling 310-*b* based on information regarding the potential areas of interference included in its FOV.

Figure 3B:
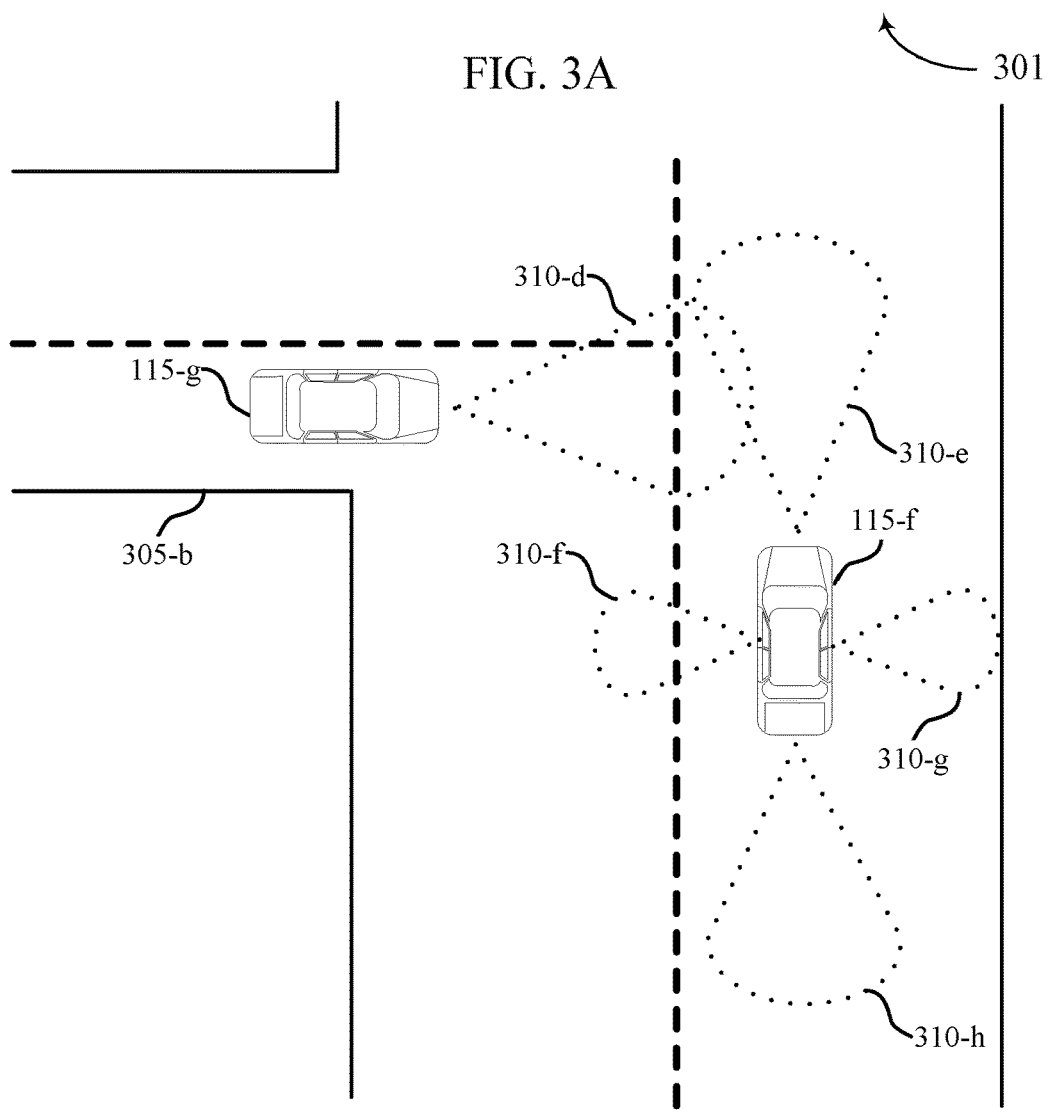

FIG. 3B illustrates an example of a wireless communications system 302 in which vehicles may experience interference between radar signals due to direction of motion and a geometry of a roadway 305-*b* within the wireless communications system 302. In some examples, wireless communications system 302 may implement aspects of the wireless communications system 100 or 200. For example, the wireless communications system 302 may include a UE 115-*f* and a UE 115-*g* that may be examples of the corresponding devices as described with reference to FIGS. 1 and 2. UE 115-*f* and 115-*g* may travel in opposite lanes of traffic around a corner of the roadway 305-*b*. The UEs 115-*f* and 115-*g* may support selecting radar transmission parameters for multi-radar coexistence based on a direction of travel, orientation (e.g., cardinal direction), and radar FOV, or any combination thereof in accordance with aspects of the present disclosure.

In some examples, the UE 115-*f* and 115-*g* may transmit LRR, MRR, or SRR to support various functionalities while traveling around the corner of the roadway 305-*b*. In some cases, radar signaling 310-*e* may be an example of an LRR signal, radar signaling 310-*f* and 310-*g* may be examples SRR, and radar signaling 310-*h* may be an MRR signal. The UE 115-*g* may transmit radar signaling 310-*d* (e.g., an LRR signal). The intersection area of the roadway 305-*b* may be an area of high mutual interference. For example, the radar signaling 310-*d* may interfere with the radar signaling 310-*e*, which may cause a reduction in the tracking ranges of the UEs 115-*g* and 115-*f*.

In some examples, there may be additional interference between radar signals as the UEs 115-*f* and 115-*g* maneuver around one another in the intersection of the roadway 305-*b*. For example, the radar signaling 310-*d* may interfere with the radar signaling 310-*f* at various points in the respective trajectories of the UEs 115-*f* and 115-*g*. The area to the rear of the UE 115-*f* may be an area of low mutual interference. For example, the radar signaling 310-*d* may be unlikely to interfere with the radar signaling 310-*h*, independent of the radar transmission parameters of either radar signaling.

The UEs 115-*f* and 115-*g* may determine respective orientations, headings, radar transmitter placements and FOVs, among other characteristics related to the operations of the UE 115-*f* and 115-*g*. In some cases, the UEs 115-*f* and 115-*g* may use the information to determine the radar transmission parameters for radar communications that may mitigate interference in the wireless communications system 302. In some cases, the UEs 115-*f* and 115-*g* may coordinate the radar transmission parameters based at least in part on areas of high potential mutual interference. For example, the UE 115-*f* may use one TDM scheme for the radar signaling 310-*e* while the UE 115-*g* uses a second, separate TDM scheme for the radar signaling 310-*d* to avoid mutual interference. The UEs 115-*f* and 115-*g* may similarly coordinate other radar transmission parameters (e.g., frequency spectrum, FMCW parameters, among other options) to avoid mutual interference.

Figure 4:
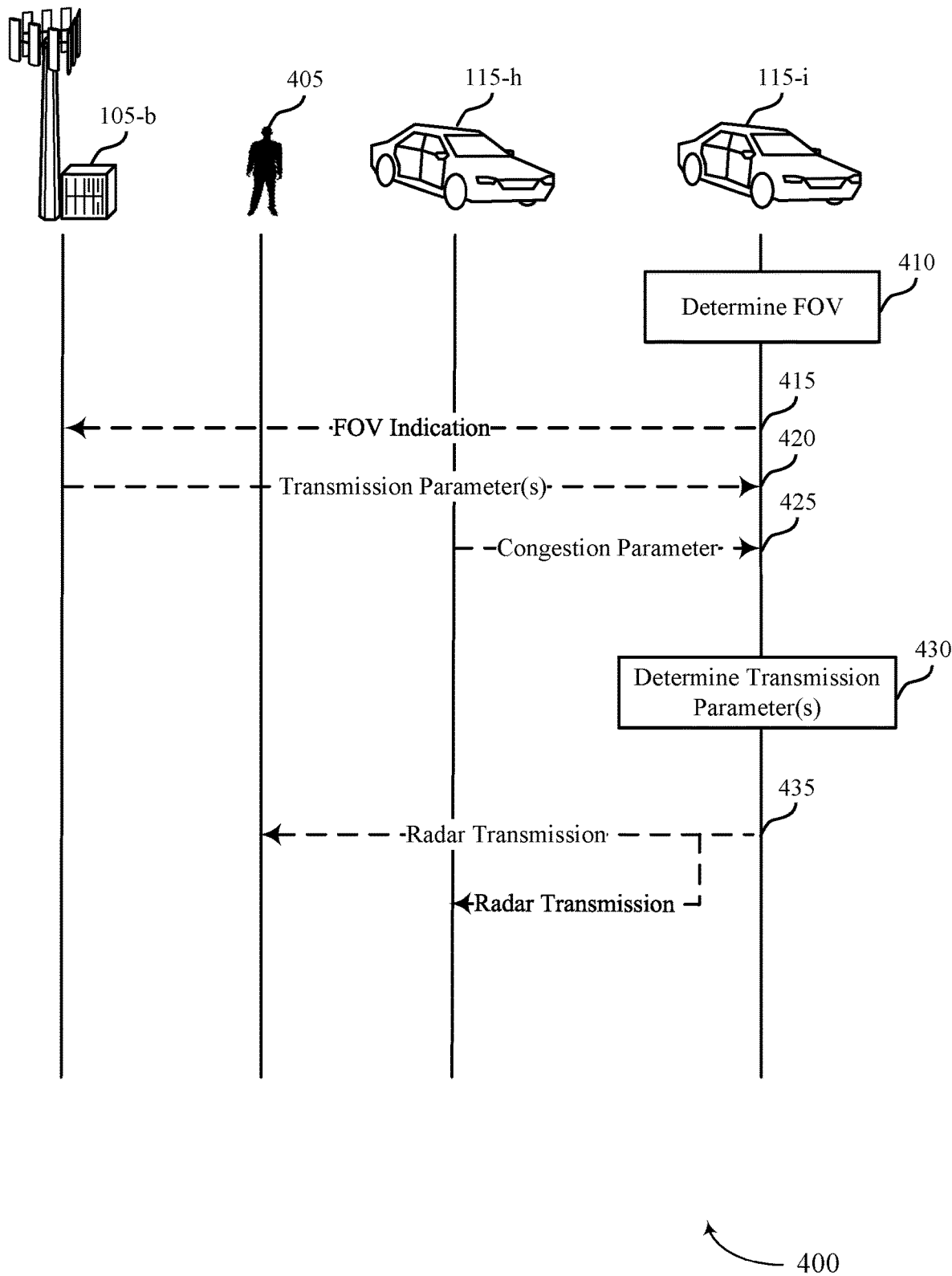
FIG. 4 illustrates an example of a process flow that supports radar transmission parameter selection for multi-radar coexistence in accordance with aspects of the present disclosure.

FIG. 4 illustrates an example of a process flow 400 that supports radar transmission parameter selection for multi-radar coexistence in accordance with aspects of the present disclosure. In some examples, the process flow 400 may implement aspects of wireless communications systems 100 and 200. Process flow 400 includes a UE 115-*h*, a UE 115-*i*, a base station 105-*b*, and a target 405 which may be examples of the corresponding devices as described with reference to FIGS. 1 and 2. In some examples, the base station 105-*b* may be an example of a roadside unit.

In the following description of the process flow 400, the operations between the UE 115-*h*, the UE 115-*i*, the target 405, and the base station 105-*b* may be transmitted (e.g., transmitted from a UE 115 or reflected from the target 405) in a different order than the exemplary order shown, or operations performed by the UE 115-*h*, the UE 115-*i*, or the base station 105-*b* may be performed in different orders or at different times. Certain operations may also be left out of the process flow 400, or other operations may be added to the process flow 400. It is to be understood that while the UE 115-*h*, the UE 115-*i*, and the base station 105-*b* are shown performing a number of the operations of process flow 400, any wireless device may perform the operations shown. Process flow 400 may illustrate selecting radar transmission parameters for multi-radar coexistence.

At 410, the UE 115-*i* may determine a FOV for radar communications within a fixed frame of reference. For example, the UE 115-*i* may determine the FOV based at least in part on a number of parameters associated with radar transmissions of the UE 115-*i* or parameters associated with the operations of the UE 115-*i*, or both. For example, the UE 115-*i* may determine the FOV based on a location of the UE 115-*i*, an orientation of the UE 115-*i* (e.g., cardinal direction), or a direction of travel of the UE 115-*i*, a placement or position of a radar transmitter associated with the UE 115-*i* (e.g., a placement of the radar transmitter on or in the UE 115-*i*), a radiation pattern of an antenna associated with the radar transmitter, or any combination thereof. The UE 115-I may determine the FOV within the fixed frame of reference which may be an example of a global frame of reference, a regional frame of reference, an environmental frame of reference or any other example of a frame of reference that is independent of the operations of a UE such as the UE 115-*i*. For example, the fixed frame of reference may remain unchanged based on the movement or operations of devices within the wireless communications system. The FOV may, for example, include a range or area in which radar transmissions of the UE 115-*i* propagate.

At 415, in some examples, the UE 115-*i* may transmit, to the base station 105-*b*, an indication of the determined FOV relative to the fixed frame of reference. In some cases, the indication may include one or more radar transmission parameters associated with radar transmissions at the UE 115-*i*. For example, the one or more radar transmission parameters may include an intended radar transmission power, a duration of a frame of the radar message, a duty cycle of frame transmissions (e.g., 100%, 50%, 25%, among other examples), or any combination thereof.

At 420, in some examples, the base station 105-*b* may transmit a set of radar transmission parameters to the UE 115-*i*. In some examples, the set of radar transmission parameters is a set of allowed radar transmission parameters that are determined by the base station and may be a function of the determined FOV. For example, the base station 105-*b* may transmit the set of allowed parameters and at, 430, the UE 115-*i* may determine the radar transmission parameters based on the received set of allowed radar transmission parameters and the determined FOV. The set of allowed radar transmission parameters may be based on environmental factors associated with a specific location of the UE 115-*i* that may not be generally applicable in all similar geometries. For example, the base station 105-*b* be aware of one or more rules that may uniquely apply to a location of the UE 115-*i* and may help mitigate radar interference by determining the set of allowed parameters based on a geometry of the location of the UE 115-*i* (e.g., cross-intersections, roundabouts, among other examples) and based on the one or more applicable rules. The one or more applicable rules may be different from rules that apply at other similar locations that have a different geometry or may be associated with one or more other different parameters, such as traffic rules or congestion. For example, the base station 105-*b* may be aware of one or more traffic rules unique to a specific roundabout but may not apply to all roundabouts. In some examples, the set of allowed parameters may, for example, be a set of rules for determining the radar transmission parameters based on the determined FOV.

In some other examples, the base station 105-*b* may transmit the set of radar transmission parameters based on receiving the indication of the FOV from the UE 115-*i*, and at 430, the UE may determine that the radar transmission parameters for radar communications are the received set of radar transmission parameters.

At 425, the UE 115-*i* may receive an indication of a congestion of radar communication associated with the geographic location of the wireless device. For example, the UE 115-*i* may receive a message including a congestion parameter from the UE 115-*h* or from the base station 105-*b* (not shown). The congestion parameter may be based on a wireless device density (e.g., vehicle UE density) in the local geographical area, an estimate of radar usage associated with one or more neighboring wireless devices, an indication of radar usage associated with one or more neighboring vehicles, or any combination thereof. In some cases, the congestion parameter may be transmitted by the UE 115-*h* as part of a basic safety message (BSM). The BSM may contain information regarding vehicle density in a local geographical area among other information. In some cases, the congestion parameter may depend on information communicated by one or more neighboring UEs to the UE 115-*h* (e.g., a V2X message).

At 430, the UE 115-*i* may determine one or more radar transmission parameter(s) based at least in part on the FOV of the radar transmissions relative to the global frame of reference. The one or more radar transmission parameters may include a TDM pattern, a frequency spectrum, a polarization, a transmission power, FMCW parameters (e.g., slope, time offset, frequency offset), PMCW waveform (e.g., code), or a waveform sequence, among other examples. In some cases, the set of radar transmission parameters may further depend on an intended transmission power, a duration of transmission of one radar frame, or a duty cycle of frame transmissions (e.g., 100%, 50%, 25%). In some cases, the set of radar transmission parameters may further depend on geographical map information corresponding to the location of the UE 115-*i*. For example, multi-lane highways may have a larger number of high mutual interference areas (e.g., between lanes, in front of or behind vehicles) than single-lane highways. In some cases, the UE 115-*i* may determine the one or more radar transmission parameter(s) based on the set of allowed radar transmission parameters received from the base station 105-*b*, the received congestion parameter, or other received information.

At 435, the UE 115-*i* may perform radar transmission based on the determined radar transmission parameters. For example, radar signaling may be transmitted to the target 405, the UE 115-*h*, or to any other physical objects within the FOV of the UE 115-*i*.

Figure 5:
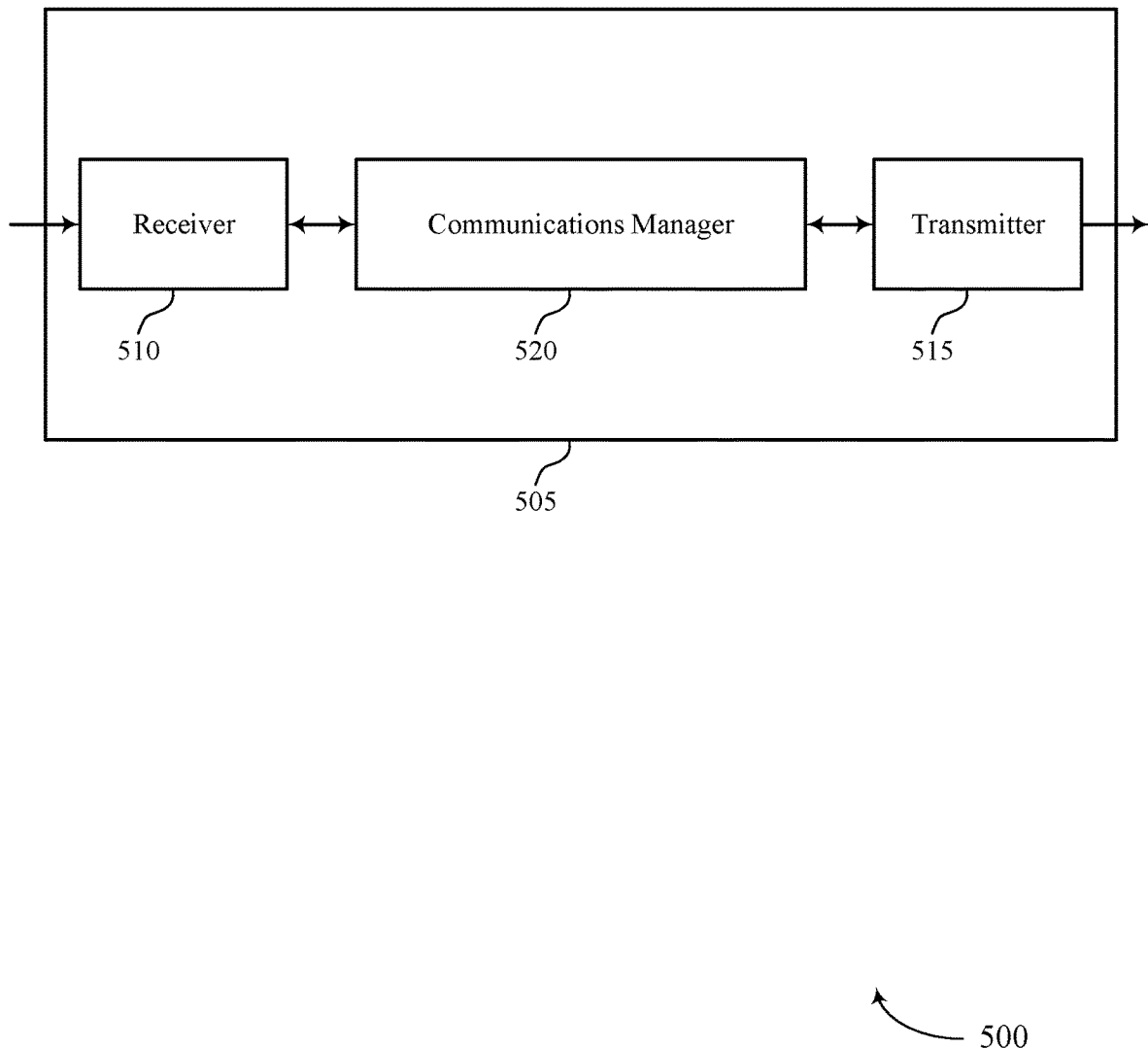
FIGS. 5 and 6 show block diagrams of devices that support radar transmission parameter selection for multi-radar coexistence in accordance with aspects of the present disclosure.

FIG. 5 shows a block diagram 500 of a device 505 that supports radar transmission parameter selection for multi-radar coexistence in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to radar transmission parameter selection for multi-radar coexistence). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to radar transmission parameter selection for multi-radar coexistence). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of radar transmission parameter selection for multi-radar coexistence as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for transmitting, based on one or more communication parameters of the wireless device, radar signaling in a radar FOV for radar communications at the wireless device relative to a fixed frame of reference for the wireless communications system. The communications manager 520 may be configured as or otherwise support a means for transmitting a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing interference in a system employing radar communications through the use of a FOV associated with the device 505. Reducing or mitigating interference may increase communication efficiency and reliability, and may provide enhanced radar target detection, among other benefits.

Figure 6:
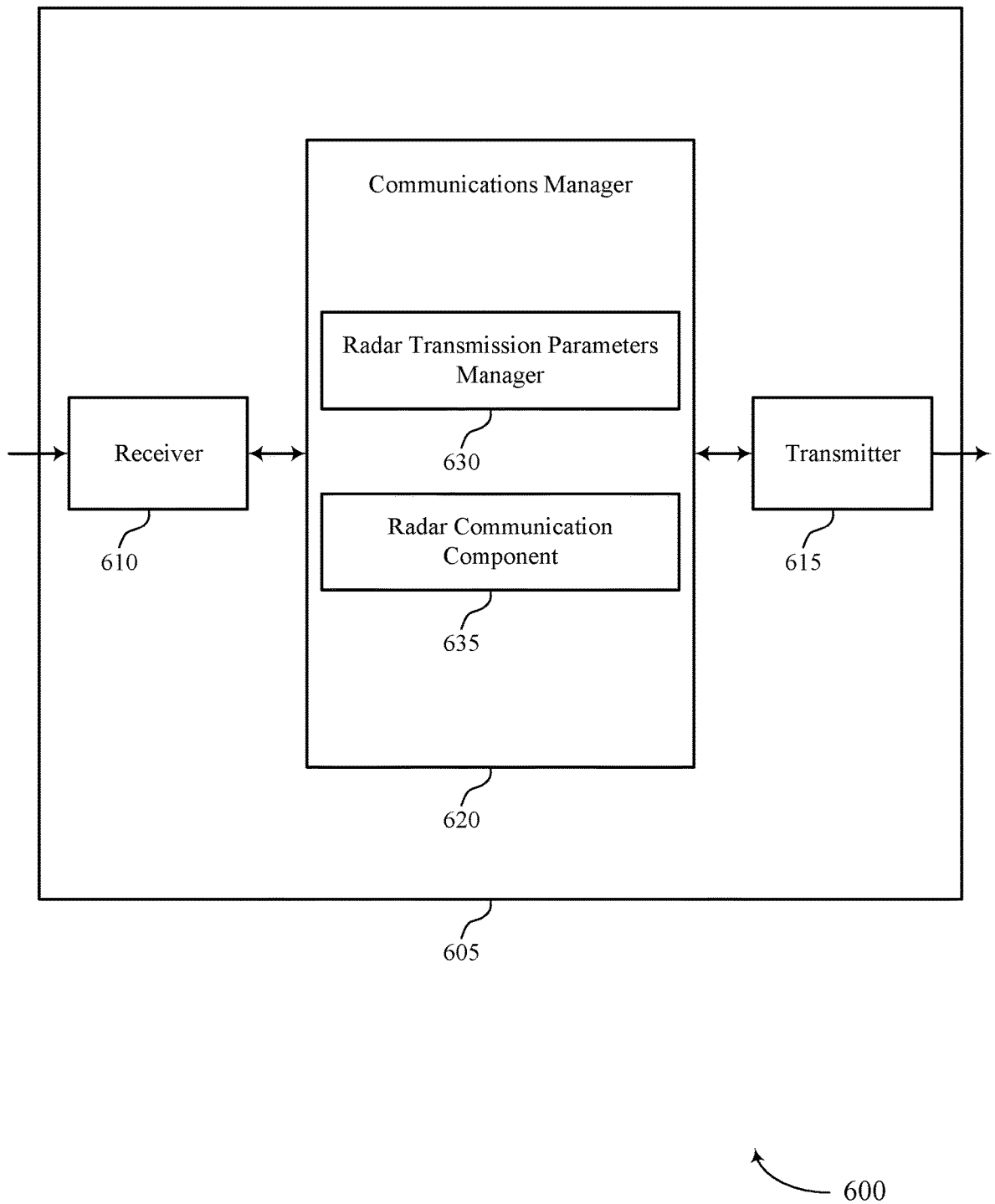

FIG. 6 shows a block diagram 600 of a device 605 that supports radar transmission parameter selection for multi-radar coexistence in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to radar transmission parameter selection for multi-radar coexistence). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to radar transmission parameter selection for multi-radar coexistence). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of radar transmission parameter selection for multi-radar coexistence as described herein. For example, the communications manager 620 may include a radar transmission parameters manager 630, a radar communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The radar transmission parameters manager 630 may be configured as or otherwise support a means for transmitting, based on one or more communication parameters of the wireless device, radar signaling in a radar FOV for radar communications at the wireless device relative to a fixed frame of reference for the wireless communications system. The radar communication component 635 may be configured as or otherwise support a means for transmitting a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

Figure 7:
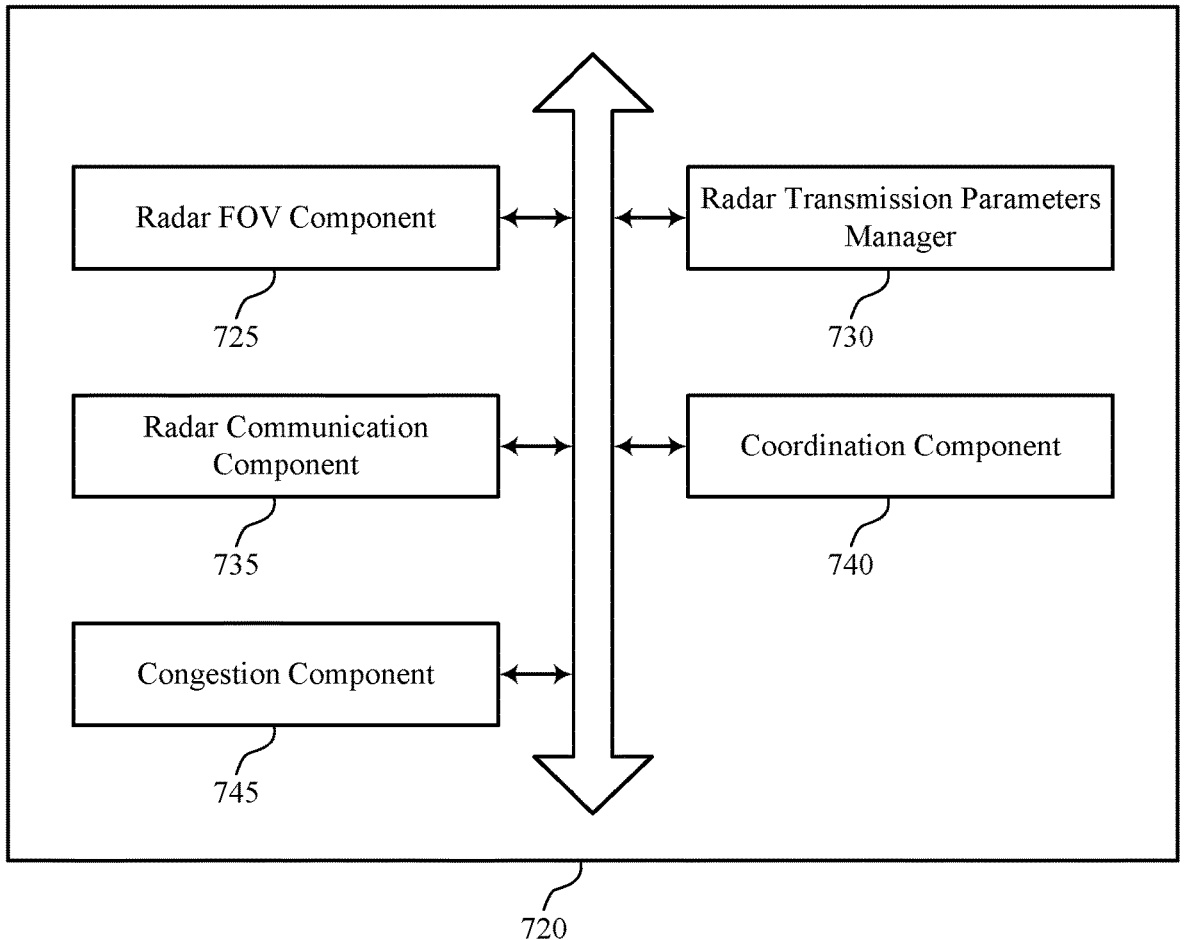
FIG. 7 shows a block diagram of a communications manager that supports radar transmission parameter selection for multi-radar coexistence in accordance with aspects of the present disclosure.

FIG. 7 shows a block diagram 700 of a communications manager 720 that supports radar transmission parameter selection for multi-radar coexistence in accordance with aspects of the present disclosure. The communications manager 720 may be an example of aspects of a communications manager 520, a communications manager 620, or both, as described herein. The communications manager 720, or various components thereof, may be an example of means for performing various aspects of radar transmission parameter selection for multi-radar coexistence as described herein. For example, the communications manager 720 may include a radar FOV component 725, a radar transmission parameters manager 730, a radar communication component 735, a coordination component 740, a congestion component 745, or any combination thereof. Each of these components may communicate, directly or indirectly, with one another (e.g., via one or more buses).

The radar transmission parameters manager 730 may be configured as or otherwise support a means for transmitting, based on one or more communication parameters of the wireless device, radar signaling in a radar FOV for radar communications at the wireless device relative to a fixed frame of reference for the wireless communications system. The radar communication component 735 may be configured as or otherwise support a means for transmitting a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

In some examples, to support determining the radar FOV, the radar FOV component 725 may be configured as or otherwise support a means for determining the radar FOV based on one or more of a geographic location of the wireless device, an orientation of the wireless device, a direction of travel of the wireless device, a location of a transmitter of the wireless device, or a radiation pattern associated with an antenna of the wireless device.

In some examples, to support determining the set of radar transmission parameters, the radar transmission parameters manager 730 may be configured as or otherwise support a means for determining the set of radar transmission parameters based on a TDM pattern, a frequency spectrum, a polarization parameter, a transmission power for the radar message, one or more parameters associated with a waveform of the radar message, a waveform sequence, or any combination thereof.

In some examples, the one or more parameters associated with the waveform of the radar message includes a slope, a time offset, a code of a PMCW waveform for the radar message, a frequency offset of a FMCW waveform for the radar message, or any combination thereof.

In some examples, to support determining the set of radar transmission parameters, the radar transmission parameters manager 730 may be configured as or otherwise support a means for determining the set of radar transmission parameters based on a transmit power for the radar message, a duration of a frame of the radar message, a duty cycle associated with frame transmissions for the wireless device, a traffic pattern associated with a geographic location of the wireless device, or any combination thereof.

In some examples, the coordination component 740 may be configured as or otherwise support a means for transmitting, to a second wireless device, an indication of the radar FOV relative to the fixed frame of reference.

In some examples, the coordination component 740 may be configured as or otherwise support a means for receiving, from the second wireless device, the set of radar transmission parameters based on transmitting the indication of the radar FOV.

In some examples, the coordination component 740 may be configured as or otherwise support a means for receiving, from the second wireless device, a set of allowed radar transmission parameters for the wireless device based on the radar FOV, where the set of radar transmission parameters is selected from the set of allowed radar transmission parameters.

In some examples, the second wireless device includes a fixed roadside unit or a base station and the fixed frame of reference is a global frame of reference.

In some examples, the indication further includes an intended transmit power of the radar message, a duration of a frame of the radar message, a duty cycle associated with a transmission frame of the radar message, a traffic pattern associated with a geographic location of the wireless device, or any combination thereof.

In some examples, the congestion component 745 may be configured as or otherwise support a means for determining a congestion of radar communications associated with a geographic location of the wireless device, where the set of radar transmission parameters is based on the congestion of radar communications.

In some examples, the congestion component 745 may be configured as or otherwise support a means for receiving, from one or more neighboring wireless devices or a base station, an indication of the congestion of radar communications.

In some examples, the congestion of radar communications is based on a vehicle density in the geographic location of the wireless device, an estimate of radar usage associated with one or more neighboring wireless devices, an indication of radar usage associated with one or more neighboring vehicles, or any combination thereof.

Figure 8:
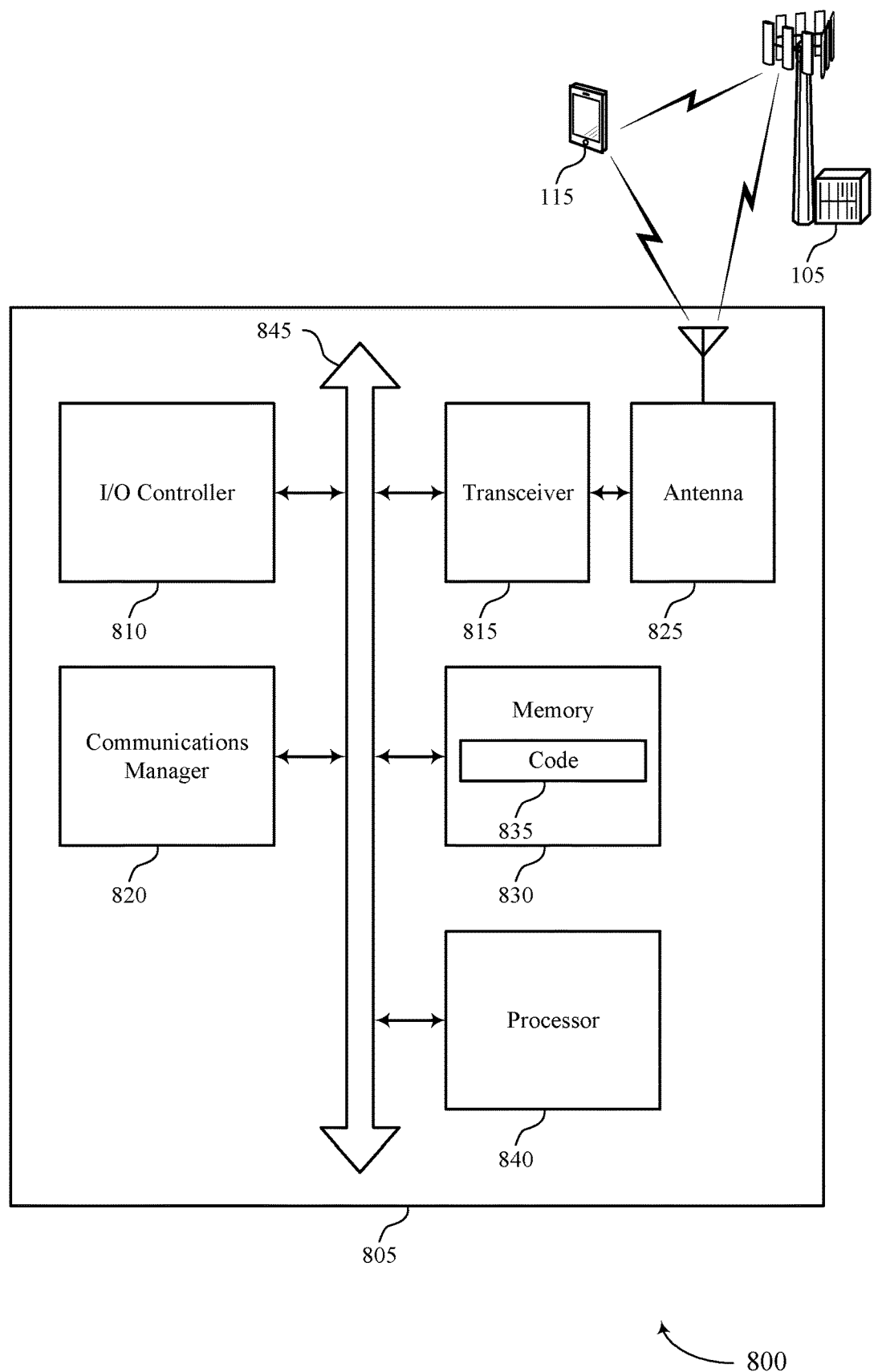
FIG. 8 shows a diagram of a system including a device that supports radar transmission parameter selection for multi-radar coexistence in accordance with aspects of the present disclosure.

FIG. 8 shows a diagram of a system 800 including a device 805 that supports radar transmission parameter selection for multi-radar coexistence in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting radar transmission parameter selection for multi-radar coexistence). For example, the device 805 or a component of the device 805 may include a processor 840 and memory 830 coupled to the processor 840, the processor 840 and memory 830 configured to perform various functions described herein.

The communications manager 820 may be configured as or otherwise support a means for transmitting, based on one or more communication parameters of the wireless device, radar signaling in a radar FOV for radar communications at the wireless device relative to a fixed frame of reference for the wireless communications system. The communications manager 820 may be configured as or otherwise support a means for transmitting a radar message using a set of radar transmission parameters for the wireless device according to the radar FOV relative to the fixed frame of reference, the set of radar transmission parameters determined based on the radar FOV, where each radar transmission parameter of the set of radar transmission parameters is a function of the radar FOV.

By including or configuring the communications manager 820 in accordance with examples as described herein, the device 805 may support techniques for reducing interference in a system employing radar communications through the use of a FOV associated with the device 805. Reducing or mitigating interference may increase communication efficiency and reliability, and as such, may reduce the complexity or number of processes performed by processor 840, which may decrease power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of radar transmission parameter selection for multi-radar coexistence as described herein, or the processor 840 and the memory 830 may be otherwise configured to perform or support such operations.

Figure 9:
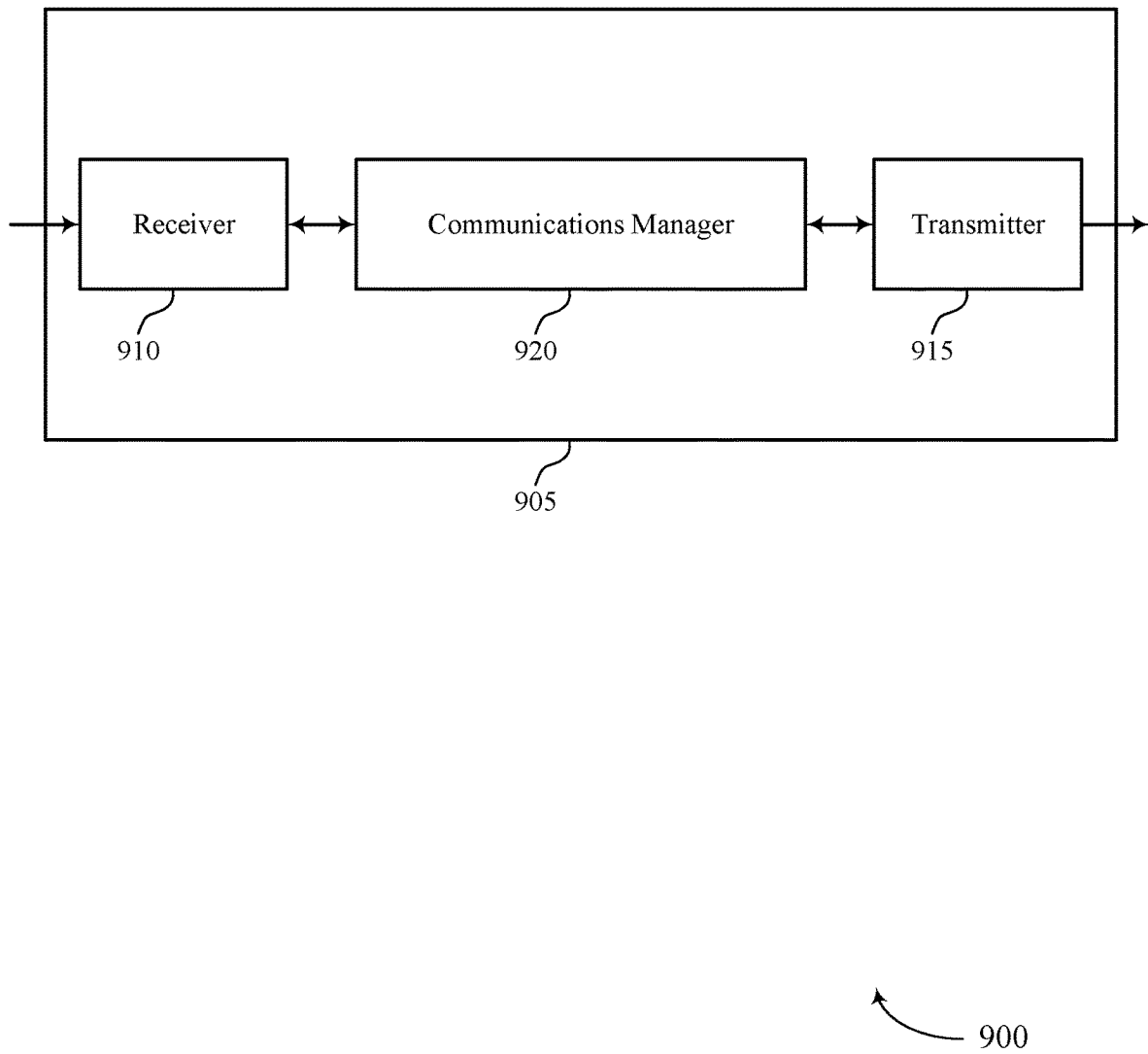
FIGS. 9 and 10 show block diagrams of devices that support radar transmission parameter selection for multi-radar coexistence in accordance with aspects of the present disclosure.

FIG. 9 shows a block diagram 900 of a device 905 that supports radar transmission parameter selection for multi-radar coexistence in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to radar transmission parameter selection for multi-radar coexistence). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to radar transmission parameter selection for multi-radar coexistence). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of radar transmission parameter selection for multi-radar coexistence as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

For example, the communications manager 920 may be configured as or otherwise support a means for determining, based on one or more communication parameters of a wireless device, a radar FOV for radar communications at a second wireless device relative to a fixed frame of reference for the wireless communications system. The communications manager 920 may be configured as or otherwise support a means for determining a set of radar transmission parameters for the second wireless device based on the radar FOV, where each radar transmission parameter of the set of radar transmission parameters is a function of the radar FOV. The communications manager 920 may be configured as or otherwise support a means for transmitting, to the second wireless device, an indication of the set of radar transmission parameters according to the radar FOV relative to the fixed frame of reference.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reducing interference in a system employing radar communications through the use of a FOV associated with the device 905. Reducing or mitigating interference may increase communication efficiency and reliability, and may provide enhanced radar target detection, among other benefits.

Figure 10:
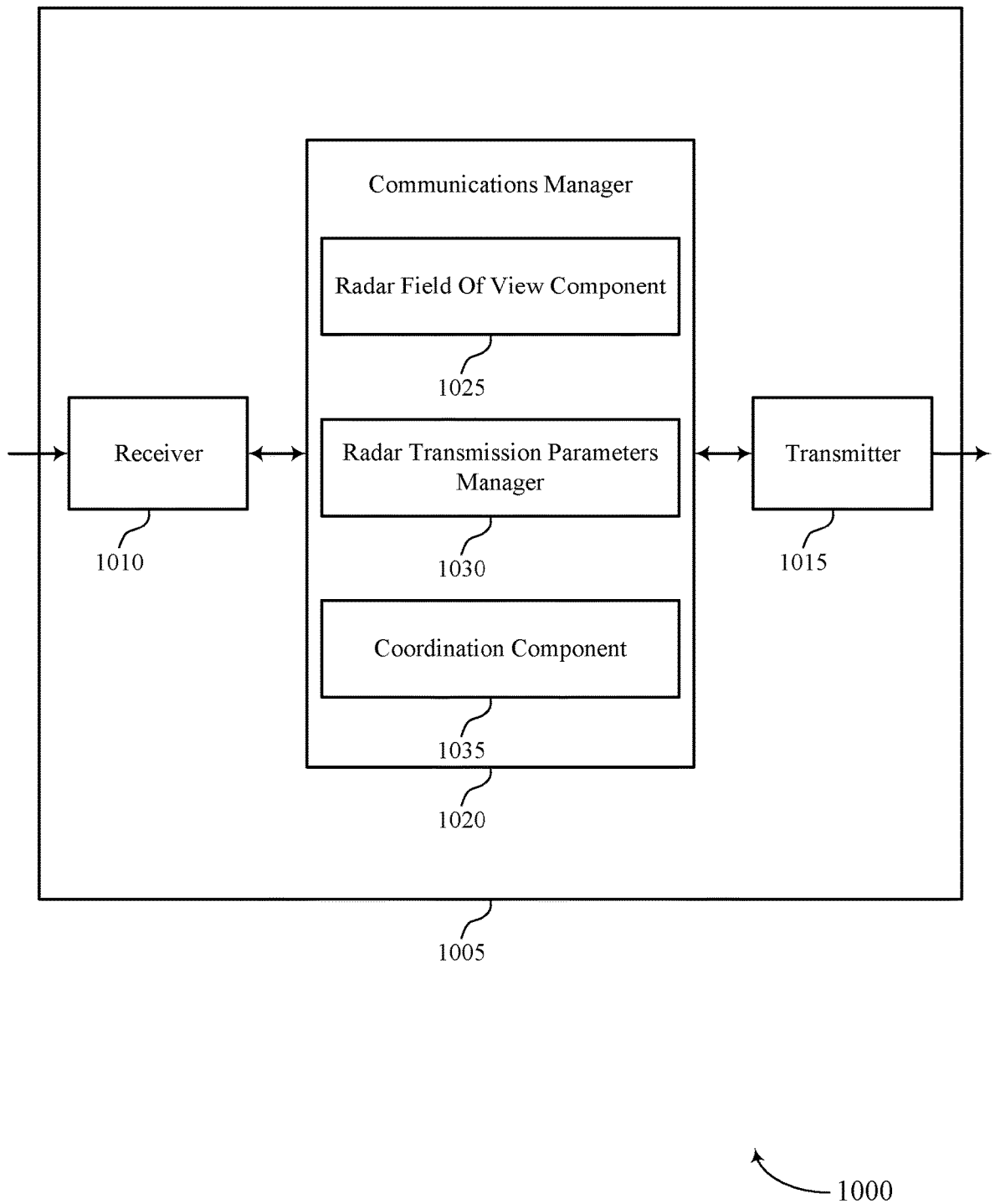

FIG. 10 shows a block diagram 1000 of a device 1005 that supports radar transmission parameter selection for multi-radar coexistence in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to radar transmission parameter selection for multi-radar coexistence). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to radar transmission parameter selection for multi-radar coexistence). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of radar transmission parameter selection for multi-radar coexistence as described herein. For example, the communications manager 1020 may include a radar FOV component 1025, a radar transmission parameters manager 1030, a coordination component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The radar FOV component 1025 may be configured as or otherwise support a means for determining, based on one or more communication parameters of a wireless device, a radar FOV for radar communications at a second wireless device relative to a fixed frame of reference for the wireless communications system. The radar transmission parameters manager 1030 may be configured as or otherwise support a means for determining a set of radar transmission parameters for the second wireless device based on the radar FOV, where each radar transmission parameter of the set of radar transmission parameters is a function of the radar FOV. The coordination component 1035 may be configured as or otherwise support a means for transmitting, to the second wireless device, an indication of the set of radar transmission parameters according to the radar FOV relative to the fixed frame of reference.

Figure 11:
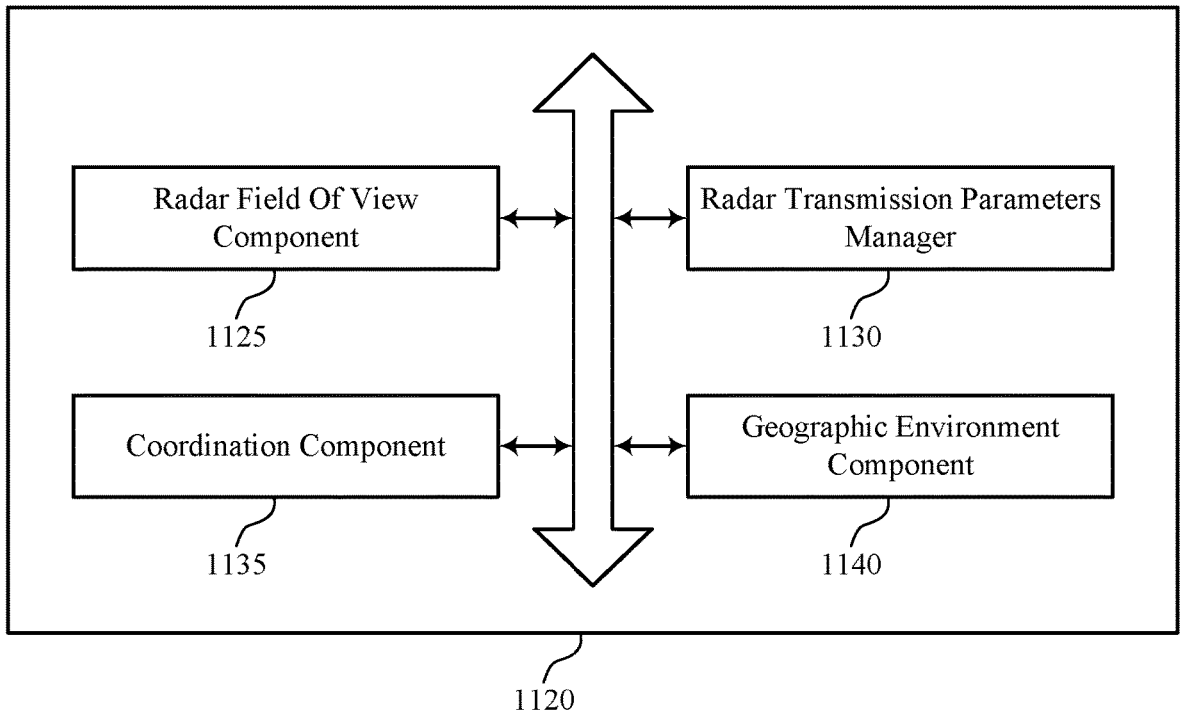
FIG. 11 shows a block diagram of a communications manager that supports radar transmission parameter selection for multi-radar coexistence in accordance with aspects of the present disclosure.

FIG. 11 shows a block diagram 1100 of a communications manager 1120 that supports radar transmission parameter selection for multi-radar coexistence in accordance with aspects of the present disclosure. The communications manager 1120 may be an example of aspects of a communications manager 920, a communications manager 1020, or both, as described herein. The communications manager 1120, or various components thereof, may be an example of means for performing various aspects of radar transmission parameter selection for multi-radar coexistence as described herein. For example, the communications manager 1120 may include a radar FOV component 1125, a radar transmission parameters manager 1130, a coordination component 1135, a geographic environment component 1140, or any combination thereof. Each of these components may communicate, directly or indirectly, with one another (e.g., via one or more buses).

The radar FOV component 1125 may be configured as or otherwise support a means for determining, based on one or more communication parameters of a wireless device, a radar FOV for radar communications at a second wireless device relative to a fixed frame of reference for the wireless communications system. The radar transmission parameters manager 1130 may be configured as or otherwise support a means for determining a set of radar transmission parameters for the second wireless device based on the radar FOV, where each radar transmission parameter of the set of radar transmission parameters is a function of the radar FOV. The coordination component 1135 may be configured as or otherwise support a means for transmitting, to the second wireless device, an indication of the set of radar transmission parameters according to the radar FOV relative to the fixed frame of reference.

In some examples, to support determining the set of radar transmission parameters, the geographic environment component 1140 may be configured as or otherwise support a means for determining one or more conditions associated with a location of the wireless device. In some examples, to support determining the set of radar transmission parameters, the radar transmission parameters manager 1130 may be configured as or otherwise support a means for determining the set of radar transmission parameters based on the one or more conditions.

In some examples, the coordination component 1135 may be configured as or otherwise support a means for receiving, from the second wireless device, an indication of the radar FOV for radar communications at the second wireless device relative to the fixed frame of reference for the wireless communications system. In some examples, the radar transmission parameters manager 1130 may be configured as or otherwise support a means for determining a set of allowed radar transmission parameters for the second wireless device based on receiving the indication of the radar FOV for radar communications at the second wireless device. In some examples, the coordination component 1135 may be configured as or otherwise support a means for transmitting, to the second wireless device, an indication of the set of allowed radar transmission parameters according to the radar FOV relative to the fixed frame of reference.

In some examples, each parameter of the set of allowed radar transmission parameters is based on the radar FOV.

In some examples, the second wireless device is a vehicle and the fixed frame of reference is a global frame of reference.

Figure 12:
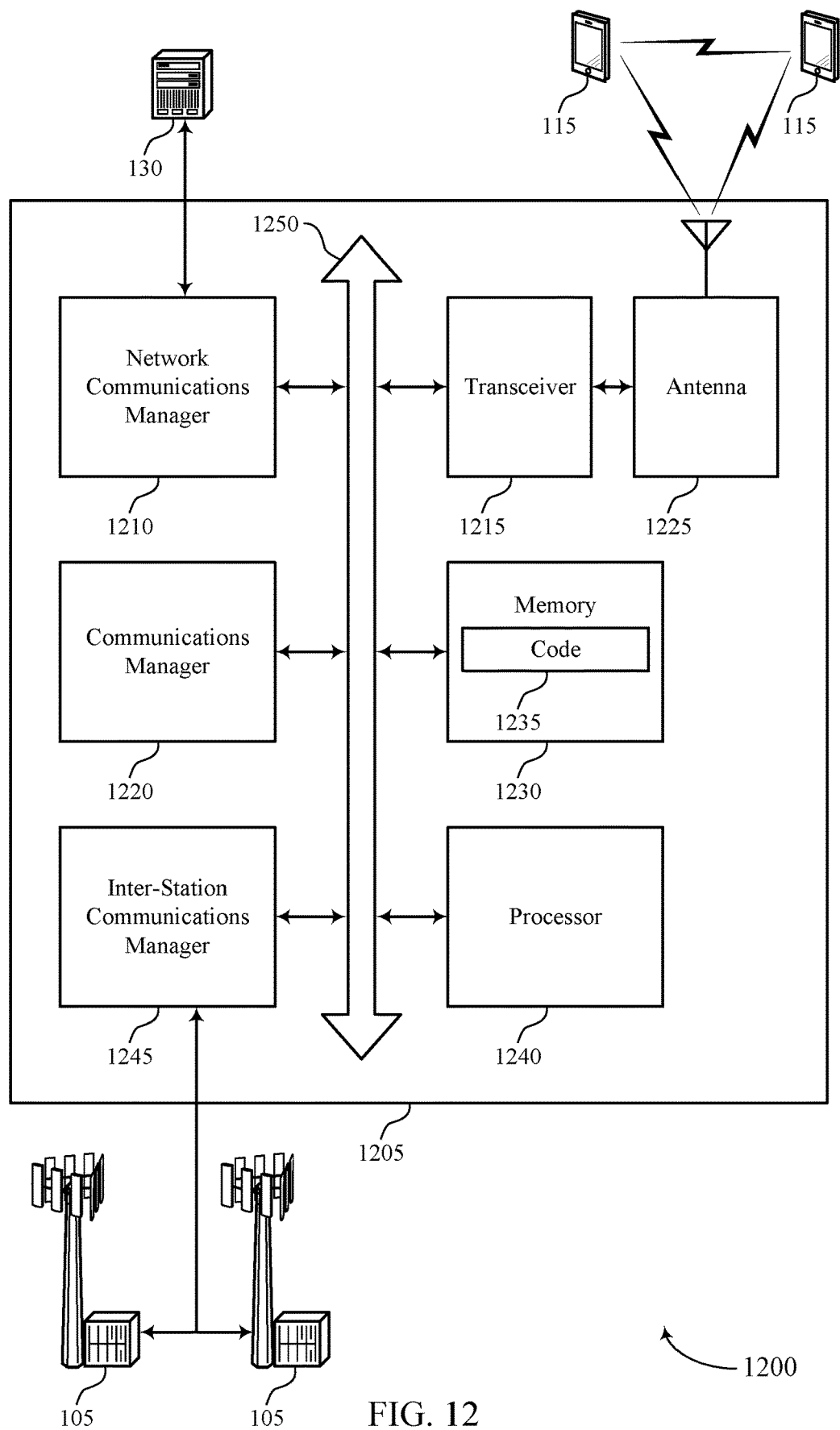
FIG. 12 shows a diagram of a system including a device that supports radar transmission parameter selection for multi-radar coexistence in accordance with aspects of the present disclosure.

FIG. 12 shows a diagram of a system 1200 including a device 1205 that supports radar transmission parameter selection for multi-radar coexistence in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting radar transmission parameter selection for multi-radar coexistence). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

For example, the communications manager 1220 may be configured as or otherwise support a means for determining, based on one or more communication parameters of a wireless device, a radar FOV for radar communications at a second wireless device relative to a fixed frame of reference for the wireless communications system. The communications manager 1220 may be configured as or otherwise support a means for determining a set of radar transmission parameters for the second wireless device based on the radar FOV, where each radar transmission parameter of the set of radar transmission parameters is a function of the radar FOV. The communications manager 1220 may be configured as or otherwise support a means for transmitting, to the second wireless device, an indication of the set of radar transmission parameters according to the radar FOV relative to the fixed frame of reference.

By including or configuring the communications manager 1220 in accordance with examples as described herein, the device 1205 may support techniques for improved communication reliability, reduced interference, and improved user experience. Reducing or mitigating interference may increase communication efficiency and reliability, and as such, may reduce the complexity or number of processes performed by processor 1240, which may decrease power consumption.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of radar transmission parameter selection for multi-radar coexistence as described herein, or the processor 1240 and the memory 1230 may be otherwise configured to perform or support such operations.

Figure 13:
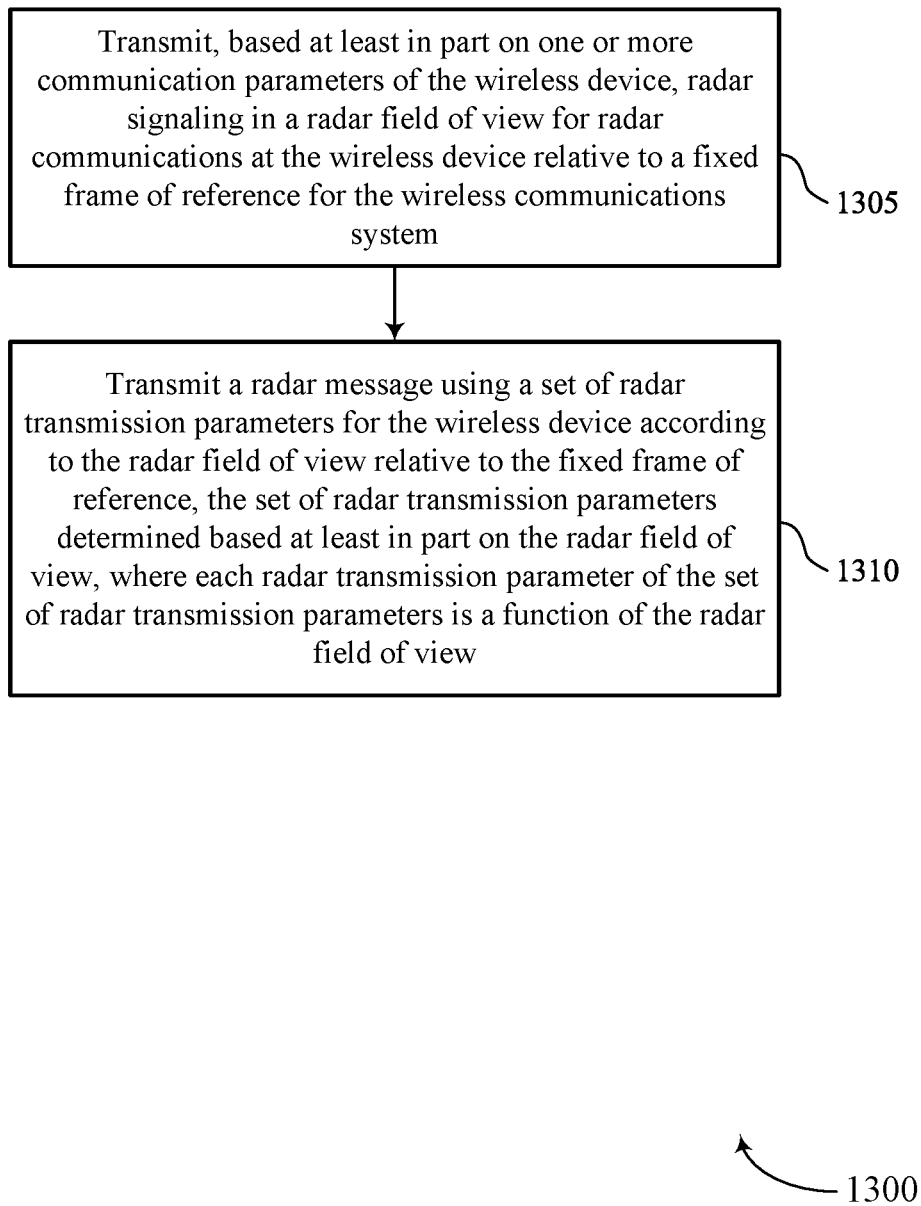
FIGS. 13 through 16 show flowcharts illustrating methods that support radar transmission parameter selection for multi-radar coexistence in accordance with aspects of the present disclosure.

FIG. 13 shows a flowchart illustrating a method 1300 that supports radar transmission parameter selection for multi-radar coexistence in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting, based at least in part on one or more communication parameters of the wireless device, radar signaling in a radar FOV for radar communications at the wireless device relative to a fixed frame of reference for the wireless communications system. The operations of 1305 may be performed in accordance with examples as disclosed herein. In some examples, aspects of the operations of 1305 may be performed by a radar transmission parameters manager 730 as described with reference to FIG. 7.

At 1310, the method may include transmitting a radar message using a set of radar transmission parameters for the wireless device according to the radar FOV relative to the fixed frame of reference, the set of radar transmission parameters determined based at least in part on the radar FOV, where each radar transmission parameter of the set of radar transmission parameters is a function of the radar FOV. The operations of 1310 may be performed in accordance with examples as disclosed herein. In some examples, aspects of the operations of 1310 may be performed by a radar communication component 735 as described with reference to FIG. 7.

Figure 14:
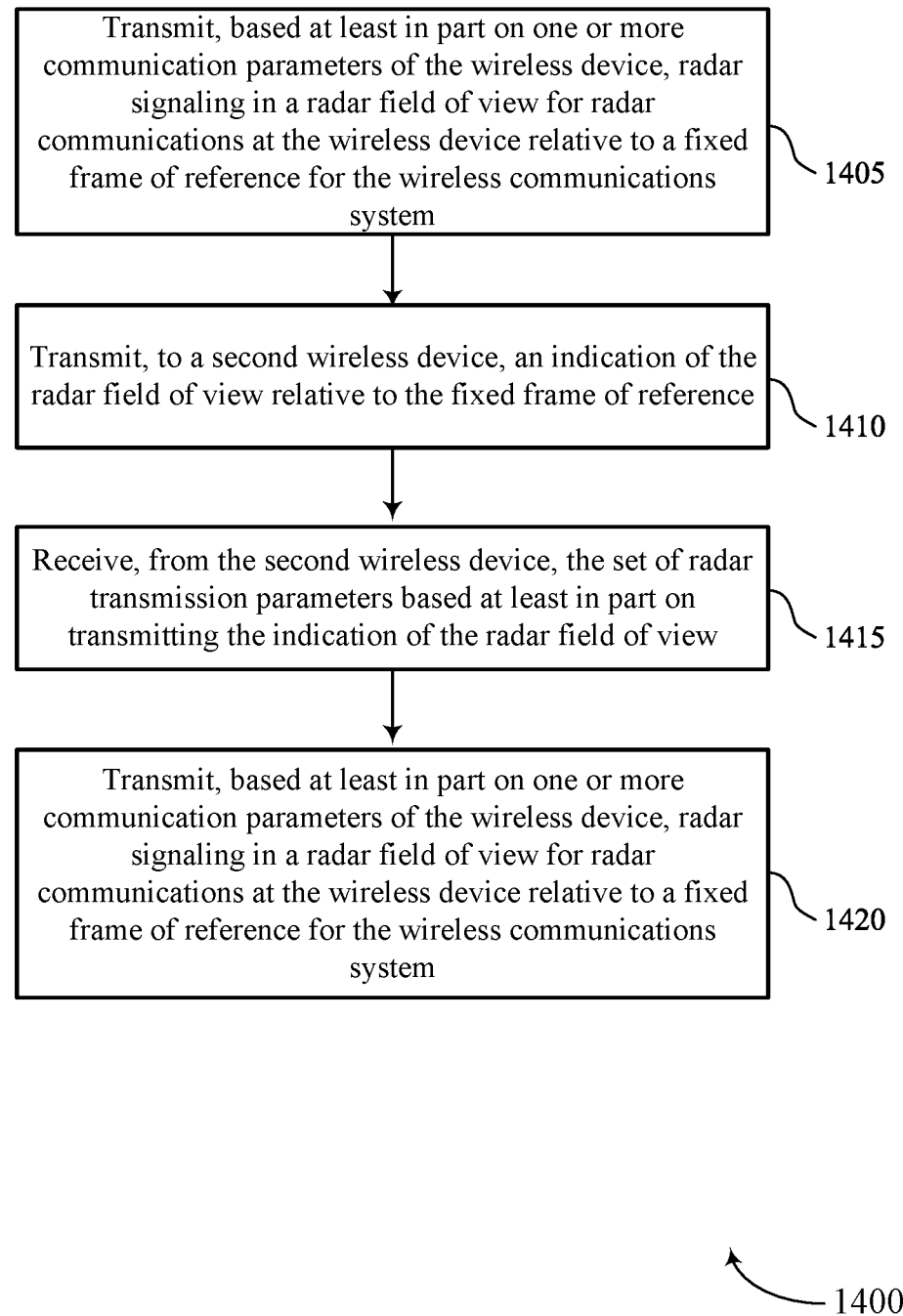

FIG. 14 shows a flowchart illustrating a method 1400 that supports radar transmission parameter selection for multi-radar coexistence in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, based at least in part on one or more communication parameters of the wireless device, radar signaling in a radar FOV for radar communications at the wireless device relative to a fixed frame of reference for the wireless communications system. The operations of 1405 may be performed in accordance with examples as disclosed herein. In some examples, aspects of the operations of 1405 may be performed by a radar transmission parameters manager 730 as described with reference to FIG. 7.

At 1410, the method may include transmitting, to a second wireless device, an indication of the radar FOV relative to the fixed frame of reference. The operations of 1410 may be performed in accordance with examples as disclosed herein. In some examples, aspects of the operations of 1410 may be performed by a coordination component 740 as described with reference to FIG. 7.

At 1415, the method may include receiving, from the second wireless device, the set of radar transmission parameters based on transmitting the indication of the radar FOV. The operations of 1415 may be performed in accordance with examples as disclosed herein. In some examples, aspects of the operations of 1415 may be performed by a coordination component 740 as described with reference to FIG. 7.

At 1420, the method may include transmitting a radar message using a set of radar transmission parameters for the wireless device according to the radar FOV relative to the fixed frame of reference, the set of radar transmission parameters determined based at least in part on the radar FOV, where each radar transmission parameter of the set of radar transmission parameters is a function of the radar FOV. The operations of 1420 may be performed in accordance with examples as disclosed herein. In some examples, aspects of the operations of 1420 may be performed by a radar communication component 735 as described with reference to FIG. 7.

Figure 15:
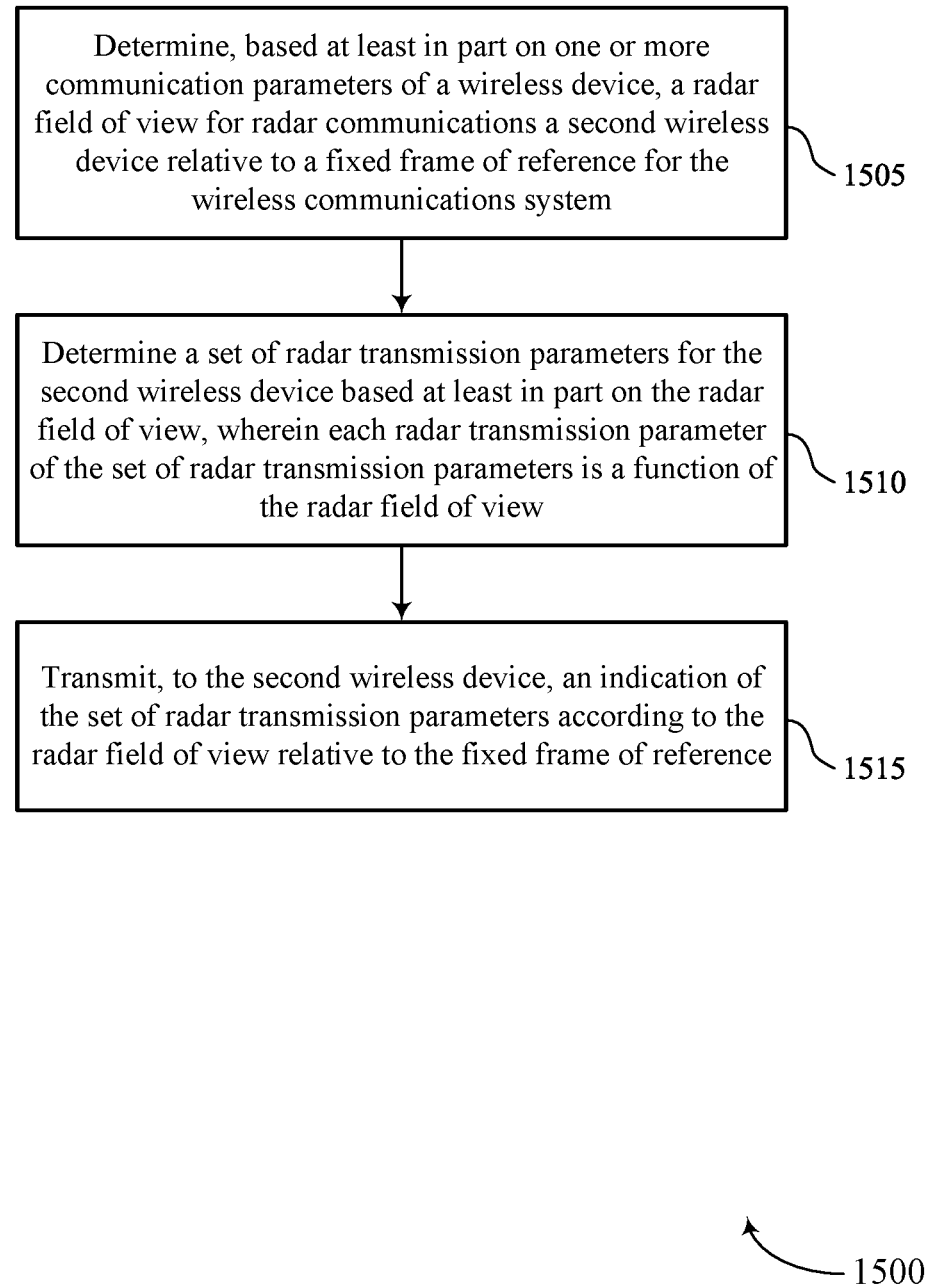

FIG. 15 shows a flowchart illustrating a method 1500 that supports radar transmission parameter selection for multi-radar coexistence in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1505, the method may include determining, based on one or more communication parameters of a wireless device, a radar FOV for radar communications at a second wireless device relative to a fixed frame of reference for the wireless communications system. The operations of 1505 may be performed in accordance with examples as disclosed herein. In some examples, aspects of the operations of 1505 may be performed by a radar FOV component 1125 as described with reference to FIG. 11.

At 1510, the method may include determining a set of radar transmission parameters for the second wireless device based on the radar FOV, where each radar transmission parameter of the set of radar transmission parameters is a function of the radar FOV. The operations of 1510 may be performed in accordance with examples as disclosed herein. In some examples, aspects of the operations of 1510 may be performed by a radar transmission parameters manager 1130 as described with reference to FIG. 11.

At 1515, the method may include transmitting, to the second wireless device, an indication of the set of radar transmission parameters according to the radar FOV relative to the fixed frame of reference. The operations of 1515 may be performed in accordance with examples as disclosed herein. In some examples, aspects of the operations of 1515 may be performed by a coordination component 1135 as described with reference to FIG. 11.

Figure 16:
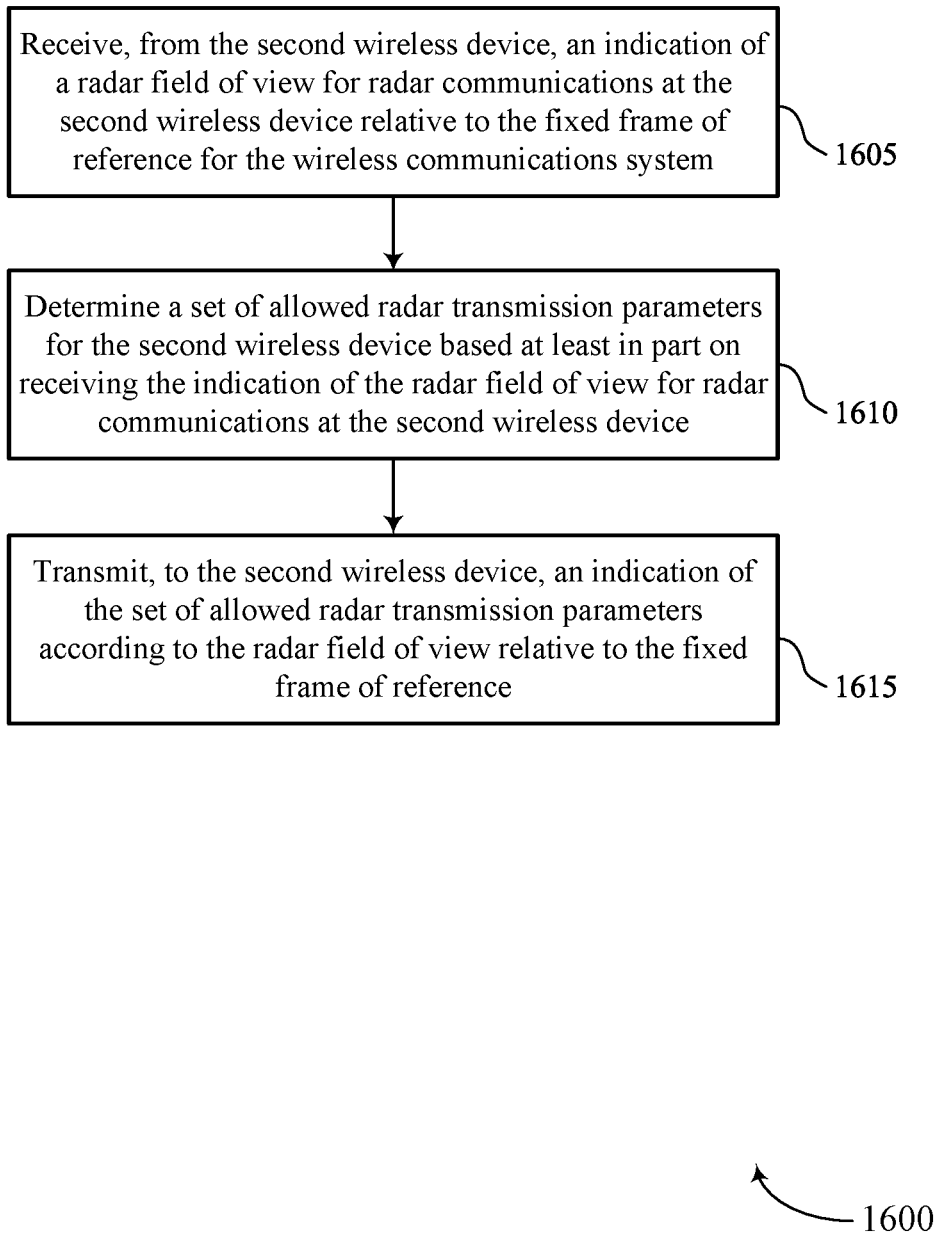

FIG. 16 shows a flowchart illustrating a method 1600 that supports radar transmission parameter selection for multi-radar coexistence in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include receiving, from the second wireless device, an indication of the radar FOV for radar communications at the second wireless device relative to the fixed frame of reference for the wireless communications system. The operations of 1605 may be performed in accordance with examples as disclosed herein. In some examples, aspects of the operations of 1605 may be performed by a coordination component 1135 as described with reference to FIG. 11.

At 1610, the method may include determining a set of allowed radar transmission parameters for the second wireless device based on receiving the indication of the radar FOV for radar communications at the second wireless device. The operations of 1610 may be performed in accordance with examples as disclosed herein. In some examples, aspects of the operations of 1610 may be performed by a radar transmission parameters manager 1130 as described with reference to FIG. 11.

At 1615, the method may include transmitting, to the second wireless device, an indication of the set of allowed radar transmission parameters according to the radar FOV relative to the fixed frame of reference. The operations of 1615 may be performed in accordance with examples as disclosed herein. In some examples, aspects of the operations of 1615 may be performed by a coordination component 1135 as described with reference to FIG. 11.

The following provides an overview of aspects of the present disclosure:

Aspect 1: A method of wireless communication at a first wireless device of a wireless communications system, comprising: transmitting, to a second wireless device, an indication of a radar field of view for radar communications at the first wireless device, the radar field of view relative to a fixed frame of reference for the wireless communications system; and transmitting a radar message using a set of radar transmission parameters for the wireless device according to the radar field of view relative to the fixed frame of reference, the set of radar transmission parameters determined based at least in part on the radar field of view, wherein each radar transmission parameter of the set of radar transmission parameters is a function of the radar field of view.

Aspect 2: The method of aspect 1, further comprising: determining the radar field of view based at least in part on one or more of a geographic location of the wireless device, an orientation of the wireless device, a direction of travel of the wireless device, a location of a transmitter of the wireless device, or a radiation pattern associated with an antenna of the wireless device.

Aspect 3: The method of any of aspects 1 through 2, further comprising: determining the set of radar transmission parameters based at least in part on a time-division multiplexing pattern, a frequency spectrum, a polarization parameter, a transmission power for the radar message, one or more parameters associated with a waveform of the radar message, a waveform sequence, or any combination thereof.

Aspect 4: The method of aspect 3, wherein the one or more parameters associated with the waveform of the radar message comprises a slope, a time offset, a code of a phase modulated continuous wave waveform for the radar message, a frequency offset of a frequency modulated continuous wave waveform for the radar message, or any combination thereof.

Aspect 5: The method of any of aspects 1 through 4, further comprising: determining the set of radar transmission parameters based at least in part on a transmit power for the radar message, a duration of a frame of the radar message, a duty cycle associated with frame transmissions for the wireless device, a traffic pattern associated with a geographic location of the wireless device, or any combination thereof.

Aspect 6: The method of any of aspects 1 through 5, further comprising: receiving, from the second wireless device, the set of radar transmission parameters based at least in part on transmitting the indication of the radar field of view.

Aspect 7: The method of any of aspects 1 through 6, further comprising: receiving, from the second wireless device, a set of allowed radar transmission parameters for the wireless device based at least in part on the radar field of view, wherein the set of radar transmission parameters is selected from the set of allowed radar transmission parameters.

Aspect 8: The method of any of aspects 1 through 7, wherein the second wireless device comprises a fixed roadside unit or a base station and the fixed frame of reference is a global frame of reference.

Aspect 9: The method of any of aspects 1 through 8, wherein the indication further comprises an intended transmit power of the radar message, a duration of a frame of the radar message, a duty cycle associated with a transmission frame of the radar message, a traffic pattern associated with a geographic location of the wireless device, or any combination thereof.

Aspect 10: The method of any of aspects 1 through 9, further comprising: determining a congestion of radar communications associated with a geographic location of the wireless device, wherein the set of radar transmission parameters is based at least in part on the congestion of radar communications.

Aspect 11: The method of aspect 10, further comprising: receiving, from one or more neighboring wireless devices or a base station, an indication of the congestion of radar communications.

Aspect 12: The method of any of aspects 10 through 11, wherein the congestion of radar communications is based at least in part on a vehicle density in the geographic location of the wireless device, an estimate of radar usage associated with one or more neighboring wireless devices, an indication of radar usage associated with one or more neighboring vehicles, or any combination thereof.

Aspect 13: A method of wireless communication at a first wireless device of a wireless communications system, comprising: receiving, from a second wireless device, an indication of a radar field of view for radar communications at the second wireless device relative to a fixed frame of reference for the wireless communications system; and transmitting, to the second wireless device, a set of radar transmission parameters for the second wireless device based at least in part on the indication of the field of view, each radar transmission parameter of the set of radar transmission parameters is a function of the radar field of view for radar communications at the second wireless device.

Aspect 14: The method of aspect 13, wherein determining the set of radar transmission parameters comprises: determining one or more conditions associated with a location of the wireless device; and determining the set of radar transmission parameters based at least in part on the one or more conditions.

Aspect 15: The method of any of aspects 13 through 14, further comprising: determining a set of allowed radar transmission parameters for the second wireless device based at least in part on receiving the indication of the radar field of view for radar communications at the second wireless device; and transmitting, to the second wireless device, an indication of the set of allowed radar transmission parameters according to the radar field of view relative to the fixed frame of reference.

Aspect 16: The method of aspect 15, wherein each parameter of the set of allowed radar transmission parameters is based at least in part on the radar field of view.

Aspect 17: The method of any of aspects 13 through 16, wherein the second wireless device is a vehicle and the fixed frame of reference is a global frame of reference.

Aspect 18: An apparatus comprising a processor; memory coupled with the processor; and instructions stored in the memory and executable by the processor to cause the apparatus to perform a method of any of aspects 1 through 12.

Aspect 19: An apparatus comprising at least one means for performing a method of any of aspects 1 through 12.

Aspect 20: A non-transitory computer-readable medium storing code the code comprising instructions executable by a processor to perform a method of any of aspects 1 through 12.

Aspect 21: An apparatus comprising a processor; memory coupled with the processor; and instructions stored in the memory and executable by the processor to cause the apparatus to perform a method of any of aspects 13 through 17.

Aspect 22: An apparatus comprising at least one means for performing a method of any of aspects 13 through 17.

Aspect 23: A non-transitory computer-readable medium storing code the code comprising instructions executable by a processor to perform a method of any of aspects 13 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a first wireless device of a wireless communications system, comprising:
   transmitting, to a second wireless device, an indication of a radar field of view for radar communications at the first wireless device, the radar field of view comprising an area in which one or more radar messages associated with the first wireless device propagate relative to a fixed frame of reference for the wireless communications system; and
   transmitting a radar message using a set of radar transmission parameters for the first wireless device in the radar field of view relative to the fixed frame of reference, the set of radar transmission parameters determined based at least in part on the radar field of view, wherein each radar transmission parameter of the set of radar transmission parameters is a function of the radar field of view.

2. The method of claim 1, further comprising:
   determining the radar field of view based at least in part on one or more of a geographic location of the first wireless device, an orientation of the first wireless device, a direction of travel of the first wireless device, a location of a transmitter of the first wireless device, or a radiation pattern associated with an antenna of the first wireless device.

3. The method of claim 1, further comprising:
   determining the set of radar transmission parameters based at least in part on a time-division multiplexing pattern, a frequency spectrum, a polarization parameter, a transmission power for the radar message, one or more parameters associated with a waveform of the radar message, a waveform sequence, or any combination thereof.

4. The method of claim 3, wherein the one or more parameters associated with the waveform of the radar message comprises a slope, a time offset, a code of a phase modulated continuous wave waveform for the radar message, a frequency offset of a frequency modulated continuous wave waveform for the radar message, or any combination thereof.

5. The method of claim 1, further comprising:
   determining the set of radar transmission parameters based at least in part on a transmit power for the radar message, a duration of a frame of the radar message, a duty cycle associated with frame transmissions for the first wireless device, a traffic pattern associated with a geographic location of the first wireless device, or any combination thereof.

6. The method of claim 1, further comprising:
   receiving, from the second wireless device, the set of radar transmission parameters based at least in part on transmitting the indication of the radar field of view.

7. The method of claim 1, further comprising:
   receiving, from the second wireless device, a set of allowed radar transmission parameters for the first wireless device based at least in part on the radar field of view, wherein the set of radar transmission parameters is selected from the set of allowed radar transmission parameters.

8. The method of claim 1, wherein the second wireless device comprises a fixed roadside unit or a network device and the fixed frame of reference is a global frame of reference.

9. The method of claim 1, wherein the indication further comprises an intended transmit power of the radar message, a duration of a frame of the radar message, a duty cycle associated with a transmission frame of the radar message, a traffic pattern associated with a geographic location of the first wireless device, or any combination thereof.

10. The method of claim 1, further comprising:
    determining a congestion of radar communications associated with a geographic location of the first wireless device, wherein the set of radar transmission parameters is based at least in part on the congestion of radar communications.

11. The method of claim 10, further comprising:
    receiving, from one or more neighboring wireless devices or a network device, an indication of the congestion of radar communications.

12. The method of claim 10, wherein the congestion of radar communications is based at least in part on a vehicle density in the geographic location of the first wireless device, an estimate of radar usage associated with one or more neighboring wireless devices, an indication of radar usage associated with one or more neighboring vehicles, or any combination thereof.

13. A method of wireless communication at a first wireless device of a wireless communications system, comprising:
    receiving, from a second wireless device, an indication of a radar field of view for radar communications at the second wireless device, the radar field of view comprising an area in which one or more radar messages associated with the second wireless device propagate relative to a fixed frame of reference for the wireless communications system; and
    transmitting, to the second wireless device, a set of radar transmission parameters for the second wireless device based at least in part on the indication of the radar field of view, wherein each radar transmission parameter of the set of radar transmission parameters is a function of the radar field of view for radar communications at the second wireless device.

14. The method of claim 13, wherein determining the set of radar transmission parameters comprises:
    determining one or more conditions associated with a location of the second wireless device; and
    determining the set of radar transmission parameters based at least in part on the one or more conditions.

15. The method of claim 13, further comprising:
    determining a set of allowed radar transmission parameters for the second wireless device based at least in part on receiving the indication of the radar field of view for radar communications at the second wireless device; and transmitting, to the second wireless device, an indication of the set of allowed radar transmission parameters according to the radar field of view relative to the fixed frame of reference.

16. The method of claim 15, wherein each parameter of the set of allowed radar transmission parameters is based at least in part on the radar field of view.

17. The method of claim 13, wherein the second wireless device is a vehicle and the fixed frame of reference is a global frame of reference.

18. An apparatus, comprising:
at least one processor;
at least one memory coupled with the at least one processor; and
instructions stored in the at least one memory and executable by the at least one processor to cause the apparatus to:
transmit, to a second wireless device, an indication of a radar field of view for radar communications at a first wireless device in a wireless communications system, the radar field of view comprising an area in which one or more radar messages associated with the second wireless device propagate relative to a fixed frame of reference for the wireless communications system; and
transmit a radar message using a set of radar transmission parameters for the first wireless device in the radar field of view relative to the fixed frame of reference, the set of radar transmission parameters determined based at least in part on the radar field of view, wherein each radar transmission parameter of the set of radar transmission parameters is a function of the radar field of view.

19. The apparatus of claim 18, wherein the instructions are further executable by the at least one processor to cause the apparatus to:
determine the radar field of view based at least in part on one or more of a geographic location of the first wireless device, an orientation of the first wireless device, a direction of travel of the first wireless device, a location of a transmitter of the first wireless device, or a radiation pattern associated with an antenna of the first wireless device.

20. The apparatus of claim 18, wherein the instructions are further executable by the at least one processor to cause the apparatus to:
determine the set of radar transmission parameters based at least in part on a time-division multiplexing pattern, a frequency spectrum, a polarization parameter, a transmission power for the radar message, one or more parameters associated with a waveform of the radar message, a waveform sequence, or any combination thereof.

21. The apparatus of claim 20, wherein the one or more parameters associated with the waveform of the radar message comprises a slope, a time offset, a code of a phase modulated continuous wave waveform for the radar message, a frequency offset of a frequency modulated continuous wave waveform for the radar message, or any combination thereof.

22. The apparatus of claim 18, wherein the instructions are further executable by the at least one processor to cause the apparatus to:
determine the set of radar transmission parameters based at least in part on a transmit power for the radar message, a duration of a frame of the radar message, a duty cycle associated with frame transmissions for the first wireless device, a traffic pattern associated with a geographic location of the first wireless device, or any combination thereof.

23. The apparatus of claim 18, wherein the instructions are further executable by the at least one processor to cause the apparatus to:
receive, from the second wireless device, the set of radar transmission parameters based at least in part on transmitting the indication of the radar field of view.

24. The apparatus of claim 18, wherein the instructions are further executable by the at least one processor to cause the apparatus to:
receive, from the second wireless device, a set of allowed radar transmission parameters for the first wireless device based at least in part on the radar field of view, wherein the set of radar transmission parameters is selected from the set of allowed radar transmission parameters.

25. The apparatus of claim 18, wherein the second wireless device comprises a fixed roadside unit or a network device and the fixed frame of reference is a global frame of reference.

26. The apparatus of claim 18, wherein the indication further comprises an intended transmit power of the radar message, a duration of a frame of the radar message, a duty cycle associated with a transmission frame of the radar message, a traffic pattern associated with a geographic location of the first wireless device, or any combination thereof.

27. The apparatus of claim 18, wherein the instructions are further executable by the at least one processor to cause the apparatus to:
determine a congestion of radar communications associated with a geographic location of the first wireless device, wherein the set of radar transmission parameters is based at least in part on the congestion of radar communications.

28. The apparatus of claim 27, wherein the instructions are further executable by the at least one processor to cause the apparatus to:
receive, from one or more neighboring wireless devices or a network device, an indication of the congestion of radar communications.

29. The apparatus of claim 27, wherein the congestion of radar communications is based at least in part on a vehicle density in the geographic location of the first wireless device, an estimate of radar usage associated with one or more neighboring wireless devices, an indication of radar usage associated with one or more neighboring vehicles, or any combination thereof.

30. An apparatus, comprising:
at least one processor;
at least one memory coupled with the at least one processor; and
instructions stored in the at least one memory and executable by the at least one processor to cause the apparatus to:
receive, from a second wireless device in a wireless communications system, an indication of a radar field of view for radar communications at the second wireless device, the radar field of view comprising an area in which one or more radar messages associated with the second wireless device propagate relative to a fixed frame of reference for the wireless communications system; and
transmit, to the second wireless device, a set of radar transmission parameters for the second wireless device based at least in part on the indication of the radar field of view, wherein each radar transmission parameter of the set of radar transmission parameters is a function of the radar field of view for radar communications at the second wireless device.

* * * * *